US012720579B2

(12) United States Patent
Hosseini et al.

(10) Patent No.: US 12,720,579 B2
(45) Date of Patent: Aug. 25, 2026

(54) SPATIAL DIVERSITY IN SIDELINK COMMUNICATIONS

(71) Applicant: QUALCOMM INCORPORATED, San Diego, CA (US)

(72) Inventors: Seyedkianoush Hosseini, San Diego, CA (US); Alexandros Manolakos, Escondido, CA (US); Wei Yang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 336 days.

(21) Appl. No.: 18/551,576

(22) PCT Filed: May 2, 2022

(86) PCT No.: PCT/US2022/072054

§ 371 (c)(1),
(2) Date: Sep. 20, 2023

(87) PCT Pub. No.: WO2022/236251

PCT Pub. Date: Nov. 10, 2022

(65) Prior Publication Data

US 2024/0057138 A1 Feb. 15, 2024

(30) Foreign Application Priority Data

May 6, 2021 (GR) .............................. 20210100306

(51) Int. Cl.
*H04W 72/40* (2023.01)
*H04W 72/25* (2023.01)
*H04W 88/04* (2009.01)

(52) U.S. Cl.
CPC ........... *H04W 72/40* (2023.01); *H04W 72/25* (2023.01); *H04W 88/04* (2013.01)

(58) Field of Classification Search
CPC ...... H04W 72/40; H04W 72/25; H04W 88/04
See application file for complete search history.

(56) References Cited

U.S. PATENT DOCUMENTS

2019/0132784 A1 5/2019 Thubert et al.
2019/0319774 A1* 10/2019 Luo ........................ H04W 72/20
(Continued)

FOREIGN PATENT DOCUMENTS

EP 3122129 A1 1/2017
WO WO-2020114651 A1 6/2020

OTHER PUBLICATIONS

International Search Report and Written Opinion—PCT/US2022/072054—ISA/EPO—Jul. 15, 2022.
(Continued)

*Primary Examiner* — Duc C Ho
(74) *Attorney, Agent, or Firm* — Holland & Hart LLP

(57) ABSTRACT

Methods, systems, and devices for wireless communications are described. In a wireless communications system, a first user equipment (UE) may identify a configuration for multiple path relaying, the multiple path relaying comprising a first path for communications between a wireless node and a remote UE via the first UE and a second path for communications between the wireless node and the remote UE via a second UE. The first UE may determine a first set of resources for the first path and a second set of resources for the second path based at least in part on the configuration for the multiple path relaying. The first UE may receive, from the wireless node, data for the remote UE on the first set of resources, and may transmit the data to the remote UE on the first set of resources.

30 Claims, 19 Drawing Sheets

(56) References Cited

U.S. PATENT DOCUMENTS

| | | | | |
|---|---|---|---|---|
| 2019/0363843 | A1* | 11/2019 | Gordaychik | H04W 28/16 |
| 2020/0314832 | A1* | 10/2020 | Baghel | H04W 72/20 |
| 2021/0105842 | A1* | 4/2021 | Cheng | H04L 5/0033 |
| 2021/0144781 | A1* | 5/2021 | Xu | H04W 76/10 |
| 2021/0212099 | A1* | 7/2021 | Yi | H04W 72/23 |
| 2022/0110141 | A1* | 4/2022 | Kwak | H04W 52/0235 |
| 2022/0338255 | A1* | 10/2022 | Abotabl | H04L 5/14 |

OTHER PUBLICATIONS

Swain S.N., et al., "A Novel Energy-Aware Utility Maximization for Efficient Device-to-Device Communication in LTE-WiFi Networks under Mixed Traffic Scenarios", Computer Networks, Elsevier, Amsterdam, NL, vol. 167, Nov. 15, 2019, pp. 1-17, XP086020211, ISSN: 1389-1286, DOI: 10.1016/J.COMNET.2019.106995 [retrieved on Nov. 15, 2019] p. 3, left-hand column, line 22-line 30.

* cited by examiner

300

700

1100

SPATIAL DIVERSITY IN SIDELINK COMMUNICATIONS

CROSS REFERENCES

The present Application is a 371 national stage filing of International PCT Application No. PCT/US2022/072054 by Hosseini et al. entitled "SPATIAL DIVERSITY IN SIDELINK COMMUNICATIONS," filed May 2, 2022; and claims priority to Greek Patent Application No. 20210100306 by Hosseini et al. entitled "SPATIAL DIVERSITY IN SIDELINK COMMUNICATIONS," filed May 6, 2021, each of which is assigned to the assignee hereof, and each of which is expressly incorporated by reference in its entirety herein.

FIELD OF TECHNOLOGY

The following relates to wireless communications, including spatial diversity in sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities or one or more network access nodes, each simultaneously supporting communication for multiple communication devices, which may be otherwise known as user equipment (UE). In some wireless communications systems, a network entity may configure UEs for relay operation to relay UEs and remote UEs. However, in some examples, relay techniques may be deficient.

SUMMARY

The described techniques relate to improved methods, systems, devices, and apparatuses that support spatial diversity in sidelink communications. Generally, the described techniques provide for a network entity to signal a configuration for relay operation to user equipments (UEs) (e.g., relay UEs and remote UEs). In some examples, the network entity may transmit a configuration (e.g., a multiple relay configuration) in a first mode of operation (e.g., Mode 1 resource allocation) and a second mode of operation (Mode 2 resource allocation). The network entity may communicate with more than one relay UEs (e.g., via multiple paths). The relay UEs may use single sidelink control information (sSCI) when transmitting relay transmissions, where transmissions may be spatial division multiplexed (SDMed), time division multiplexed (TDMed), or frequency division multiplexed (FDMed). In some examples, the relay UEs may use multiple SCI (mSCI) when transmitting relay transmissions.

In some cases, under Mode 1 resource allocation, the network entity may indicate configurations indicating whether a relay UE is associated with sSCI operation or mSCI operation. Such configurations may be indicated to each relay UE dynamically (e.g., using a medium access control (MAC) control element (MACCE) or downlink control information (DCI)) or semi-statically (e.g., using radio resource control (RRC) signaling). The network entity may also indicate one or more parameters to the relay UEs for relaying data to a remote UE. The network entity may further assign time and frequency resources to be used by a group of relay UEs. Additionally or alternatively, under Mode 2 resource allocation, the relay UEs with a capability to support joint transmission modes may identify each other (e.g., as part of a discovery process) and may select resources by sensing and reservation.

A method for wireless communication at a first UE is described. The method may include identifying a configuration for multiple path relaying, the multiple path relaying including a first path for communications between a wireless node and a second UE via the first UE and a second path for communications between the wireless node and the second UE via a third UE, determining a first set of resources for the first path based on the configuration for the multiple path relaying, determining a second set of resources for the second path based on the configuration for the multiple path relaying, receiving, from the wireless node, data for the second UE on the first set of resources, and transmitting the data to the second UE on the first set of resources.

An apparatus for wireless communication at a first UE is described. The apparatus may include a processor, and a memory coupled with the processor, with instructions stored in the memory, the instructions being executable by the processor to cause the apparatus to identify a configuration for multiple path relaying, the multiple path relaying including a first path for communications between a wireless node and a second UE via the first UE and a second path for communications between the wireless node and the second UE via a third UE, determine a first set of resources for the first path based on the configuration for the multiple path relaying, determine a second set of resources for the second path based on the configuration for the multiple path relaying, receive, from the wireless node, data for the second UE on the first set of resources, and transmit the data to the second UE on the first set of resources.

Another apparatus for wireless communication at a first UE is described. The apparatus may include means for identifying a configuration for multiple path relaying, the multiple path relaying including a first path for communications between a wireless node and a second UE via the first UE and a second path for communications between the wireless node and the second UE via a third UE, means for determining a first set of resources for the first path based on the configuration for the multiple path relaying, means for determining a second set of resources for the second path based on the configuration for the multiple path relaying, means for receiving, from the wireless node, data for the re second mote UE on the first set of resources, and means for transmitting the data to the second UE on the first set of resources.

A non-transitory computer-readable medium storing code for wireless communication at a first UE is described. The code may include instructions executable by a processor to identify a configuration for multiple path relaying, the multiple path relaying including a first path for communications between a wireless node and a second UE via the first UE and a second path for communications between the wireless node and the second UE via a third UE, determine a first set of resources for the first path based on the configuration for the multiple path relaying, determine a second set of resources for the second path based on the configuration for the multiple path relaying, receive, from the wireless node, data for the second UE on the first set of resources, and transmit the data to the second UE on the first set of resources.

In some examples of the method, apparatuses, and non-transitory computer-readable medium described herein, identifying the configuration may include operations, features, means, or instructions for receiving the configuration from a network entity, the configuration indicating whether the first UE may be associated with sSCI or mSCI.

Some examples of the method, apparatuses, and non-transitory computer-readable medium described herein may further include operations, features, means, or instructions for transmitting control information to the second UE based on the configuration, the control information identifying both the first set of resources for the first path and the second set of resources for the second path.

In some examples of the method, apparatuses, and non-transitory computer-readable medium described herein, the configuration indicates that the first set of resources may be FDMed with the second set of resources, TDMed with the second set of resources, SDMed with the second set of resources, or any combination thereof.

In some examples of the method, apparatuses, and non-transitory computer-readable medium described herein, the configuration indicates that the first set of resources may be SDMed with the second set of resources and the method, apparatuses, and non-transitory computer-readable medium may include further operations, features, means, or instructions for identifying a demodulation reference signal (DMRS) code division multiplexing (CDM) group assignment for the first UE according to the configuration.

Some examples of the method, apparatuses, and non-transitory computer-readable medium described herein may further include operations, features, means, or instructions for transmitting a sidelink acknowledgement feedback to the wireless node based on the configuration indicating that the first UE may be configured to report the sidelink acknowledgement feedback.

Some examples of the method, apparatuses, and non-transitory computer-readable medium described herein may further include operations, features, means, or instructions for monitoring a physical sidelink feedback channel (PSFCH) associated with the data based on identifying that first UE may be configured to report the sidelink acknowledgement feedback.

In some examples of the method, apparatuses, and non-transitory computer-readable medium described herein, transmitting the data on the first set of resources may include operations, features, means, or instructions for applying, based on the configuration indicating that an orthogonal cover code (OCC) may be to be used by the first UE, the OCC to the data and transmitting, to the second UE, the data on the first set of resources based on the OCC applied to the data.

In some examples of the method, apparatuses, and non-transitory computer-readable medium described herein, the configuration indicates at least one of a modulation and coding scheme (MCS), a redundancy version (RV) index, a set of multiple layers for transmission, a new data indicator (NDI), a hybrid automatic repeat request (HARQ) process number, an indication of frequency hopping, a physical uplink control channel (PUCCH) for reporting feedback, a time gap, a counter identifier, or any combination thereof.

In some examples of the method, apparatuses, and non-transitory computer-readable medium described herein, transmitting the indication of the configuration may include operations, features, means, or instructions for transmitting the indication of the configuration of the first UE via RRC signaling, DCI, or a MAC CE.

Some examples of the method, apparatuses, and non-transitory computer-readable medium described herein may further include operations, features, means, or instructions for determining that the first UE may be included in a group of relay UEs based on the configuration, where each relay UE in the group of relay UEs may be associated with a common radio network temporary identifier, or a common source and destination identifier, or both.

Some examples of the method, apparatuses, and non-transitory computer-readable medium described herein may further include operations, features, means, or instructions for receiving an indication to switch from a first sidelink control mode to a second sidelink control mode, where the first sidelink control mode may be associated with sSCI and the second sidelink control mode may be associated with mSCI and transmitting, to the second UE, the data according to the second sidelink control mode based on receiving the indication.

Some examples of the method, apparatuses, and non-transitory computer-readable medium described herein may further include operations, features, means, or instructions for performing a channel sensing operation and transmitting, to the third UE based on performing the channel sensing operation, a channel reservation for the first set of resources for transmitting the data to the second UE.

In some examples of the method, apparatuses, and non-transitory computer-readable medium described herein, identifying the configuration may include operations, features, means, or instructions for receiving, from a network entity, a control signal including the configuration indicating the first set of resources for the first UE and the second set of resources for the third UE.

In some examples of the method, apparatuses, and non-transitory computer-readable medium described herein, one or more of the first path or the second path utilize one-to-many communications from the first UE to the second UE and the third UE.

A method for wireless communication at a wireless node is described. The method may include transmitting, to a first UE and a second UE, an indication of a configuration for multiple path relaying, the multiple path relaying including a first path between the wireless node and a third UE via the first UE and a second path between the wireless node and the third UE via the second UE, transmitting, to the first UE, data for the third UE on a first set of resources for the first path that are based on the configuration for the multiple path relaying, and transmitting, to the second UE, data for the third UE on a second set of resources for the second path that are based on the configuration for the multiple path relaying.

An apparatus for wireless communication at a wireless node is described. The apparatus may include a processor, and a memory coupled with the processor, with instructions stored in the memory, the instructions being executable by the processor to cause the apparatus to transmit, to a first UE and a second UE, an indication of a configuration for multiple path relaying, the multiple path relaying including a first path between the wireless node and a third UE via the first UE and a second path between the wireless node and the third UE via the second UE, transmit, to the first UE, data for the third UE on a first set of resources for the first path that are based on the configuration for the multiple path relaying, and transmit, to the second UE, data for the third UE on a second set of resources for the second path that are based on the configuration for the multiple path relaying.

Another apparatus for wireless communication at a wireless node is described. The apparatus may include means for transmitting, to a first UE and a second UE, an indication of a configuration for multiple path relaying, the multiple path relaying including a first path between the wireless node and a third UE via the first UE and a second path between the wireless node and the third UE via the second UE, means for transmitting, to the first UE, data for the third UE on a first set of resources for the first path that are based on the configuration for the multiple path relaying, and means for transmitting, to the second UE, data for the third UE on a second set of resources for the second path that are based on the configuration for the multiple path relaying.

A non-transitory computer-readable medium storing code for wireless communication at a wireless node is described. The code may include instructions executable by a processor to transmit, to a first UE and a second UE, an indication of a configuration for multiple path relaying, the multiple path relaying including a first path between the wireless node and a third UE via the first UE and a second path between the wireless node and the third UE via the second UE, transmit, to the first UE, data for the third UE on a first set of resources for the first path that are based on the configuration for the multiple path relaying, and transmit, to the second UE, data for the third UE on a second set of resources for the second path that are based on the configuration for the multiple path relaying.

In some examples of the method, apparatuses, and non-transitory computer-readable medium described herein, transmitting the indication of the configuration may include operations, features, means, or instructions for transmitting the indication of the configuration to the first UE, the configuration indicating whether the first UE may be associated with sSCI or mSCI.

In some examples of the method, apparatuses, and non-transitory computer-readable medium described herein, transmitting the configuration the indication of the configuration may include operations, features, means, or instructions for transmitting the configuration indicating that the first UE may be to transmit control information for both the data for the third UE on the first set of resources for the first path and the data for the third UE on the second set of resources for the second path.

In some examples of the method, apparatuses, and non-transitory computer-readable medium described herein, the configuration indicates that the first set of resources may be FDMed with the second set of resources, TDMed with the second set of resources, SDMed with the second set of resources, or any combination thereof.

In some examples of the method, apparatuses, and non-transitory computer-readable medium described herein, the configuration indicates that the first set of resources may be SDMed with the second set of resources and the method, apparatuses, and non-transitory computer-readable medium may include further operations, features, means, or instructions for identifying a DMRS CDM group assignment for the first UE according to the configuration.

Some examples of the method, apparatuses, and non-transitory computer-readable medium described herein may further include operations, features, means, or instructions for receiving a sidelink acknowledgement feedback based on the configuration indicating that the first UE may be configured to report the sidelink acknowledgement feedback.

In some examples of the method, apparatuses, and non-transitory computer-readable medium described herein, the configuration further indicates that a physical sidelink shared channel (PSSCH) OCC may be to be used by the first UE for transmitting the data to the third UE.

In some examples of the method, apparatuses, and non-transitory computer-readable medium described herein, the configuration further indicates at least one of an MCS, an RV index, a set of multiple layers for transmission, an NDI, a HARQ process number, an indication of frequency hopping, a PUCCH for reporting feedback, a time gap, a counter identifier, or any combination thereof.

Some examples of the method, apparatuses, and non-transitory computer-readable medium described herein may further include operations, features, means, or instructions for determining that the first UE may be included in a group of relay UEs based on the configuration, where each relay UE in the group of relay UEs may be associated with a common radio network temporary identifier, or a common source and destination identifier, or both.

Some examples of the method, apparatuses, and non-transitory computer-readable medium described herein may further include operations, features, means, or instructions for transmitting an indication to switch from a first sidelink control mode to a second sidelink control mode, where the first sidelink control mode may be associated with sSCI and the second sidelink control mode may be associated with mSCI.

In some examples of the method, apparatuses, and non-transitory computer-readable medium described herein, identifying the configuration may include operations, features, means, or instructions for transmitting, to the first UE, a first control signal including the configuration for the multiple path relaying indicating the first set of resources and transmitting, to the second UE, a second control signal including the second set of resources for the second UE.

In some examples of the method, apparatuses, and non-transitory computer-readable medium described herein, one or more of the first path or the second path utilize one-to-many communications from the first UE to the second UE and the third UE.

DETAILED DESCRIPTION

Figure 1:
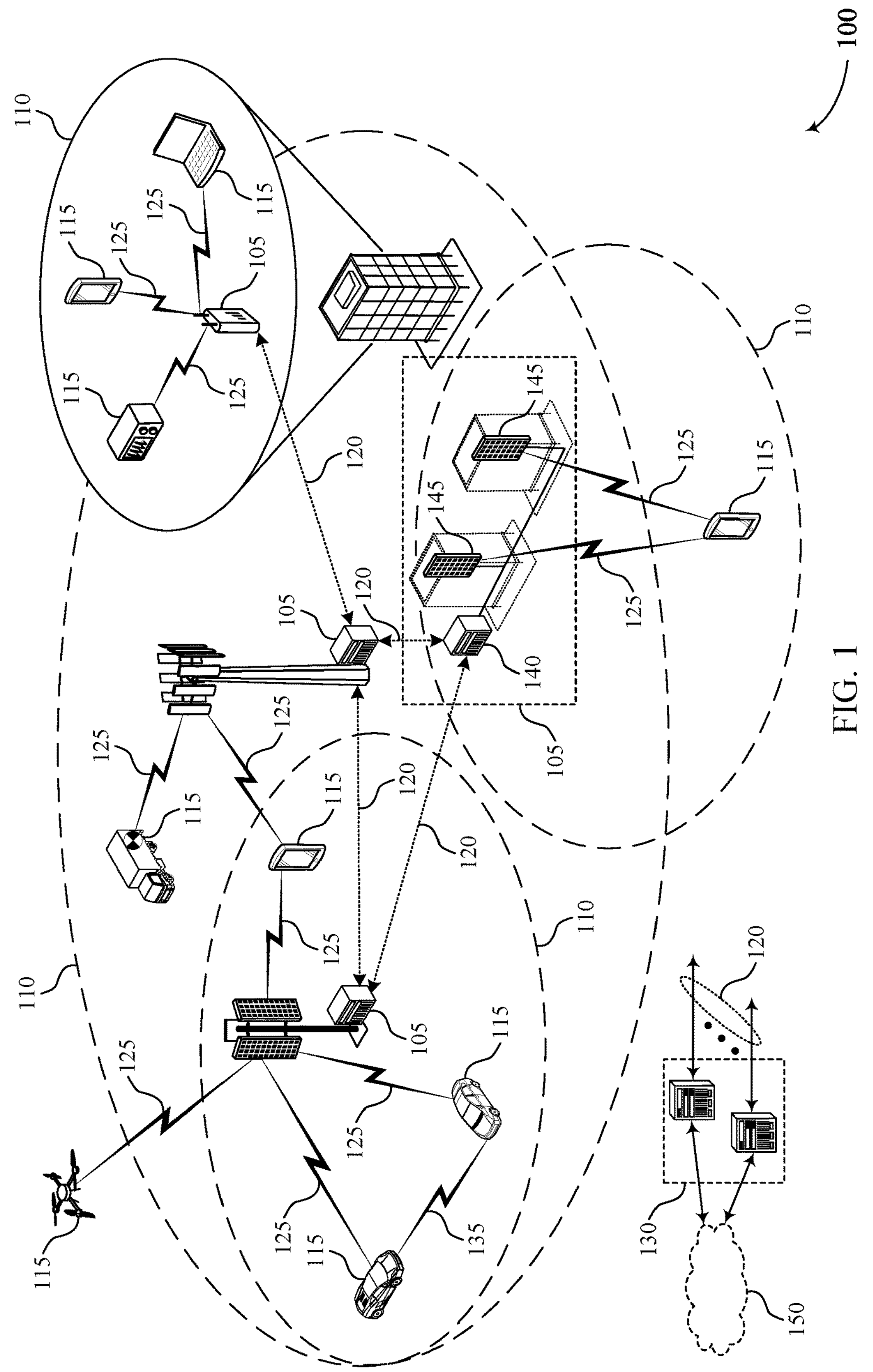
FIG. 1 illustrates an example of a wireless communications system that supports spatial diversity in sidelink communications in accordance with aspects of the present disclosure.

A wireless communications system may support communication between communication devices. In particular, a wireless communications system may support both access links and sidelinks for communications between communication devices. An access link may refer to a communication link between a user equipment (UE) and a network entity. For example, an access link may support uplink signaling, downlink signaling, connection procedures, etc. A sidelink may refer to any communication link between similar wireless devices (e.g., a communication link between UEs, or a backhaul communication link between network entities). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and one or more other UEs within a coverage area. In some examples, the coverage area may include the group of UEs (e.g., a coverage area provided by a network entity, a coverage area outside of the coverage area provided by the network entity, or any combination thereof). In some wireless communications systems, a network entity may communicate with a remote UE (e.g., a device outside of a coverage area of the network entity or in a lower-coverage area of the network entity) over a communication link that may include multiple links. For example, the communication link may include a sidelink link between the remote UE and a relay UE (e.g., a device in a coverage area of the network entity and that provides coverage to the remote UE) and a relay link (e.g., a direct link) between the relay UE and the network entity. In some examples, the remote UE may transmit information (e.g., one or more data or control messages) to the relay UE over the sidelink link, and the relay UE may relay or forward (e.g., transmit, retransmit) the information to the network entity over the relay link. Additionally or alternatively, the network entity may transmit information to the relay UE over the relay link and the relay UE may relay or forward (e.g., transmit, retransmit) the information to the remote UE over the sidelink link.

In some examples, sidelink communications may support two modes of resource allocation mechanism. In a first mode of operation (e.g., Mode 1 resource allocation), resources may be scheduled by a network entity. In a second mode of operation (e.g., Mode 2 resource allocation), network entities may not be involved in sidelink communications and UEs may perform autonomous resource selection. For example, a UE may reserve a set of resources without a network entity allocating resources to UEs participating in sidelink communications. In some cases, in the second resource allocation (e.g., Mode 2 resource allocation), sidelink coordination across relay UEs may be determined by the relay UEs. Aspects of the present disclosure provide for indicating operation mode and one or more parameters to the relay UEs and indicating a mode of operation to a remote UE. Additionally or alternatively, relay UEs may benefit from techniques depicted herein to manage the transmissions across multiple relay UEs in a group under Mode 2 resource allocation.

Techniques described herein support a network entity signaling a configuration for relay operation to UEs (e.g., relay UEs and remote UEs). In some examples, the network entity may transmit the configuration (e.g., a multiple relay configuration) in Mode 1 resource allocation and Mode 2 resource allocation. In some cases, a network entity may communicate with more than one relay UEs (e.g., via multiple paths). The relay UEs may transmit relay transmissions using a single sidelink control information (sSCI), where transmissions may be spatial division multiplexed (SDMed), time division multiplexed (TDMed), or frequency division multiplexed (FDMed). Alternatively, the relay UEs may transmit relay transmissions using multiple SCI (mSCI).

In some cases, under Mode 1 resource allocation, the network entity may indicate configurations for sSCI and mSCI operations to each relay UE dynamically (e.g., using a medium access control (MAC) control element (MAC-CE) or downlink control information (DCI)) or semi-statically (e.g., using radio resource control (RRC) signaling). The network entity may also indicate one or more parameters to the relay UEs for relaying data to a remote UE. For example, the one or more parameters may include a modulation and coding scheme (MCS) and a redundancy version (RV) index. The network entity may further assign time and frequency resources to be used by a group of relay UEs. In some cases, under Mode 2 resource allocation, the relay UEs (e.g., sidelink nodes) with a capability to support joint transmission modes may identify each other (e.g., as part of a discovery process) and may select resources by sensing and reservation. In some cases, under both Mode 1 resource allocation and Mode 2 resource allocation, the remote UEs may be aware of the operation modes via an indication from the relay UEs.

Particular aspects of the subject matter described herein may be implemented to realize one or more advantages. The described techniques may support improvements in spatial diversity for supporting ultra-reliable low latency communications (URLLC) and other applications by increasing coverage and reducing signaling overhead. Further, in some examples, the multiple relay UE configuration as described herein may support higher data rates and diversity for control and data by providing multiple relay paths in case of blocking or fading of one or more paths, thereby improving latency and reliability. As such, supported techniques may include improved network operations, and, in some examples, may promote network efficiencies, among other benefits.

Aspects of the disclosure are initially described in the context of wireless communications systems. Aspects of the disclosure are further illustrated by and described herein with reference to resource configurations and a process flow. Aspects of the disclosure are further illustrated by and described herein with reference to apparatus diagrams, system diagrams, and flowcharts that relate to spatial diversity in sidelink communications.

FIG. 1 illustrates an example of a wireless communications system 100 that supports spatial diversity in sidelink communications in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1. As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link (e.g., in accordance with a midhaul interface protocol) or a fronthaul communication link (e.g., in accordance with a fronthaul interface protocol), or any combination thereof. The backhaul communication links 120, midhaul communication links, or fronthaul communication links may be or include one or more wired links (e.g., an electrical link, an optical fiber link), one or more wireless links (e.g., a radio link, a wireless optical link), among other examples or various combinations thereof.

One or more of the network entities 105 described herein may include or may be referred to as a network entity (e.g., a base transceiver station, a radio network entity, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a network entity) may be implemented in an aggregated or monolithic network entity architecture, or alternatively, in a disaggregated network entity architecture. For example, a network entity 105 may include one or more of a central unit (CU), a distributed unit (DU), a radio unit (RU), a Radio Access Network (RAN) Intelligent Controller (RIC) (e.g., a Near-Real Time RIC (Near-RT RIC), a Non-Real Time RIC (Non-RT RIC), a Service Management and Orchestration (SMO) system, or any combination thereof. An RU may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU, a DU, and an RU is flexible and may support different functionalities depending upon which functions (e.g., network layer functions, protocol layer functions, baseband functions, radio frequency functions, and any combinations thereof) are performed at a CU, a DU, or an RU. For example, a functional split of a protocol stack may be employed between a CU and a DU such that the CU may support one or more layers of the protocol stack and the DU may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU may be connected to one or more DUs or RUs, and the one or more DUs or RUs may host lower protocol layers, such as layer 1 (L1) (e.g., physical (PHY) layer) or L2 (e.g., radio link control (RLC) layer, a MAC layer) functionality and signaling, and may each be at least partially controlled by the CU. Additionally, or alternatively, a functional split of the protocol stack may be employed between a DU and an RU such that the DU may support one or more layers of the protocol stack and the RU may support one or more different layers of the protocol stack. The DU may support one or multiple different cells (e.g., via one or more RUs). In some cases, a functional split between a CU and a DU, or between a DU and an RU may be within a protocol layer (e.g., some functions for a protocol layer may be performed by one of a CU, a DU, or an RU, while other functions of the protocol layer are performed by a different one of the CU, the DU, or the RU). A CU may be functionally split further into CU control plane (CU-CP) and CU user plane (CU-UP) functions. A CU may be connected to one or more DUs via a midhaul communication link (e.g., F1, F1-c, F1-u), and a DU may be connected to one or more RUs via a fronthaul communication link (e.g., open fronthaul (FH) interface). In some examples, a midhaul communication link or a fronthaul communication link may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (IAB) network architecture (e.g., to a core network 130). In some cases, in an IAB network, one or more network entities 105 (e.g., IAB nodes) may be partially controlled by each other. One or more IAB nodes may be referred to as a donor entity or an IAB donor. One or more DUs (e.g., one or more RUs) may be partially controlled by CUs associated with a donor network entity 105 (e.g., a donor network entity). The one or more donor network entities 105 (e.g., IAB donors) may be in communication with one or more additional network entities 105 (e.g., IAB nodes) via supported access and backhaul links (e.g., backhaul communication links 120). IAB nodes may include an IAB mobile termination (IAB-MT) controlled (e.g., scheduled) by DUs of a coupled IAB donor. An IAB-MT may include an independent set of antennas for relay of communications with UEs 115, or may share the same antennas (e.g., of an RU) of an IAB node used for access via the DU of the IAB node (e.g., referred to as virtual IAB-MT (vIAB-MT)). In some examples, the IAB nodes may include DUs that support communication links with additional entities (e.g., IAB nodes, UEs 115) within the relay chain or configuration of the access network (e.g., downstream). In such cases, one or more components of the disaggregated RAN architecture (e.g., one or more IAB nodes or components of IAB nodes) may be configured to operate according to the techniques described herein.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal FDM (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and N f may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, the network entities 105 may have similar frame timings, and transmissions from different network entities 105 may be approximately aligned in time. For asynchronous operation, the network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. That is, a first path for communications between a network entity 105 and a remote UE 115 via a first UE (e.g., a relay UE), a second path for communications between the network entity 105 and the remote UE 115 via a second UE (e.g., a relay UE), or both may utilize 1:M communications from the first UE to the second UE and the remote UE. In some examples, a network entity 105 facilitates the scheduling of resources for D2D communications. In other cases, D2D communications are carried out between the UEs 115 without the involvement of a network entity 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described herein with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a network entity 105 may communicate with a remote UE 115 (e.g., a device outside of a coverage area of the network entity 105 or in a lower-coverage area of the network entity 105) over a communication link, (e.g., a communication link 125, a D2D communication link 135) that includes multiple links. For example, the communication link may include a sidelink link between the remote UE 115 and a relay UE 115 (e.g., a device in a coverage area of the network entity 105 and that provides coverage to the remote UE 115) and a relay link (e.g., a direct link) between the relay UE 115 and the network entity 105. In uplink communications, the remote UE 115 may transmit information (e.g., one or more data or control messages) to the relay UE 115 over the sidelink link, and the relay UE 115 may relay or forward (e.g., transmit, retransmit) the information to the network entity 105 over the relay link. In downlink communications, the network entity 105 may transmit information to the relay UE 115 over the relay link and the relay UE 115 may relay or forward (e.g., transmit, retransmit) the information to the remote UE 115 over the sidelink link. The relay UE 115 may also transmit its own information (e.g., one or more data or control messages originating at the relay UE 115) to the network entity 105 via the relay link (e.g., the direct link).

In some cases, relay UEs 115 may utilize different modes of operation. For example, as in a multiple transmit-receive point (mTRP) case, the relay UEs 115 may transmit sSCI a physical sidelink control channel (PSCCH) and both relay UEs 115 may transmit physical sidelink shared channel (PSSCH). In some cases, the relay UEs 115 may transmit mSCI, where more than one relay UE 115 may transmit PSSCH and PSCCH.

In some examples, relay UEs may be implemented as network deployed relays (e.g., road-side units (RSUs)) to support remote UEs 115 (e.g., pedestrians). Relay UEs 115 may also be implemented in personal IoT networks with multiple primary relay UEs, or with multiple controllers communicating with a sensor in IIoT. In some cases, symmetric relaying may be used, where a single relay UE 115 may support downlink and uplink communications with a remote UE 115, with no direct link between the network entity 105 and the remote UE 115 (e.g., no Uu direct link). In some cases, asymmetric relaying may be used where downlink transmissions may be sent between the network entity 105 and the remote UE 115 (e.g., over a Uu link) and where uplink transmissions may be sent via a relay UE 115. In some cases, a relaying scheme may be used to associate a user (e.g., a remote UE) with multiple sources (e.g., a b network entity 105 or a remote UE 115) and relay UEs 115. In some cases, a forward link may enable higher data rates by aggregating distributed antennas at multiple non-collocated relays, thereby improving latency and reliability. Additionally or alternatively, reverse link may provide diversity for control and data, thereby improving latency and reliability.

In some cases, to support URLLC applications, a network entity 105 and UEs 115 may utilize multiple path relaying between relay UEs 115 and a remote UE 115 using Mode 1 resource allocation and Mode 2 resource allocation. In some cases, under Mode 1 resource allocation, the network entity 105 may indicate configurations for sSCI and mSCI operations to each relay UE 115 dynamically (e.g., using a MAC-CE or DCI) or semi-statically (e.g., using RRC signaling). The network entity 105 may also indicate a number of parameters to the relay UEs 115. The parameters may include as an MCS and an RV index, among others. In some examples, the network entity may assign all resources for relay group-to-UE. In some cases, under Mode 2 resource allocation, the relay UEs 115 (e.g., sidelink nodes) with a capability to support any of the joint transmission modes may identify each other (e.g., as part of a discovery process). Under Mode 2 resource allocation, resources may be selected by sensing and reservation. In some cases, under both Mode 1 resource allocation and Mode 2 resource allocation, the remote UEs 115 may be aware of the operation modes via an indication from the relay UEs 115.

Figure 2:
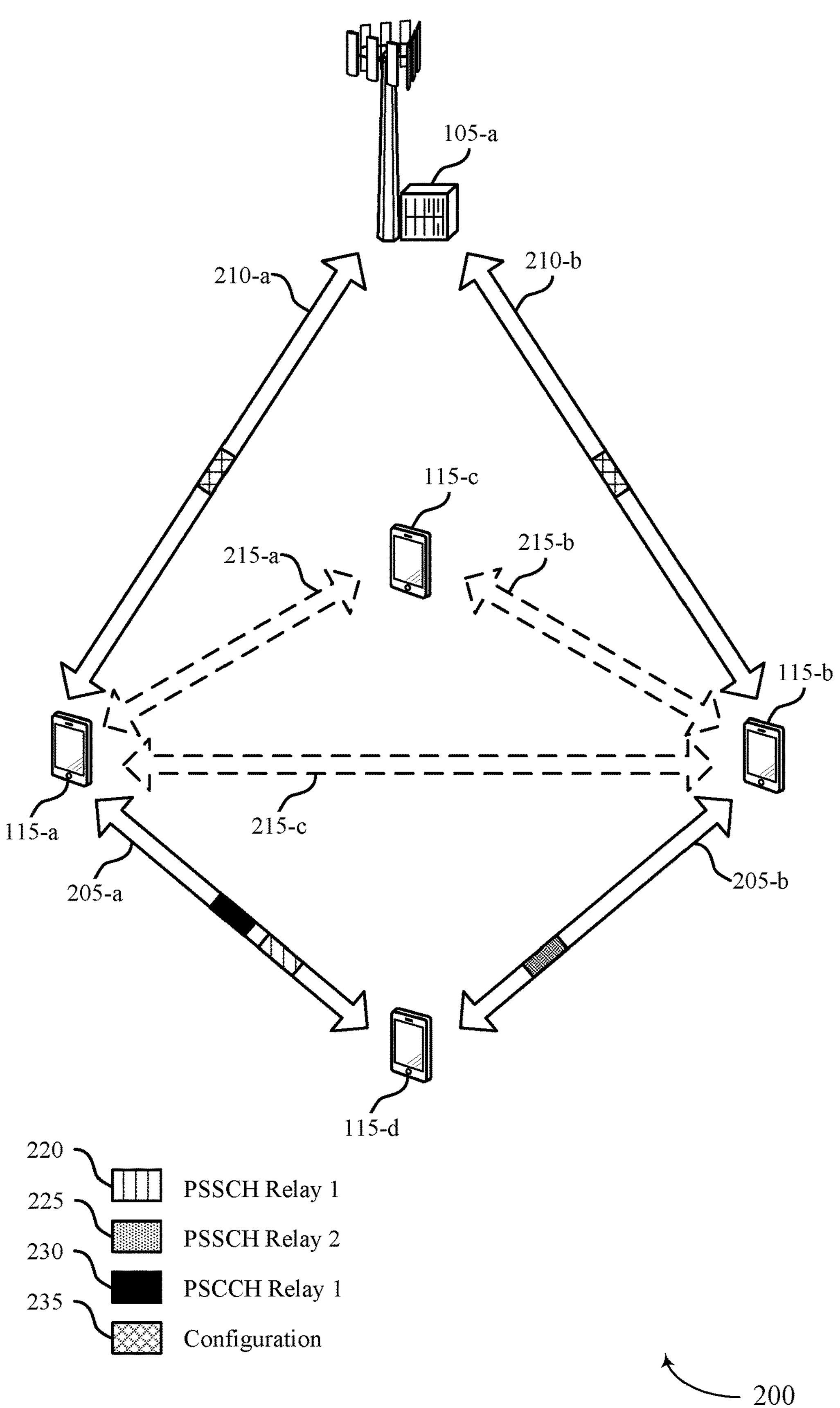
FIG. 2 illustrates an example of a wireless communications system that supports spatial diversity in sidelink communications in accordance with aspects of the present disclosure.

FIG. 2 illustrates an example of a wireless communications system 200 that supports spatial diversity in sidelink communications in accordance with aspects of the present disclosure. In some examples, the wireless communications system 200 may implement, or be implemented by, aspects of wireless communications system 100. For example, the wireless communications system 200 may include a network entity network entity 105-*a*, a UE 115-*a*, a UE 115-*b*, a UE 115-*c*, and a UE 115-*d*, which may be examples of corresponding devices described herein with reference to FIG. 1. In the example of FIG. 2, the UE 115-*a* and the UE 115-*b* may be examples of relay UEs, the UE 115-*c* may be an example of a source UE, and the UE 115-*d* may be an example of a remote UE.

In some cases, a network entity 105-*a* may communicate with a UE 115-*d* (e.g., a remote UE, a device outside of a coverage area of the network entity 105-*a* or in a lower-coverage area of the network entity 105-*a*) over a communication link that may include multiple communication links. For example, the communication links may include a sidelink link 205-*a* between the UE 115-*d* and a UE 115-*a* (e.g., a first relay UE, a device in a coverage area of the network entity 105-*a* and that provides coverage to the UE 115-*d*) and a relay link 210-*a* (e.g., a direct link) between the UE 115-*a* and the network entity 105-*a*. The communication links may also include a sidelink link 205-*b* between the UE 115-*d* and a UE 115-*b* (e.g., a second relay UE) and a relay link 210-*b* (e.g., a direct link) between the UE 115-*b* and the network entity 105-*a*.

In an example of uplink communication, the UE 115-*d* may transmit information (e.g., one or more data or control messages) to the UE 115-*a* and the UE 115-*b* over the sidelink link 205-*a* and the sidelink link 205-*b*, and the UE 115-*a* and the UE 115-*b* may relay or forward (e.g., transmit, retransmit) the information to the network entity 105-*a* over the relay link 210-*a* and the relay link 210-*b*, respectively. In an example of downlink communication, the network entity 105-*a* may transmit information to the UE 115-*a* and the UE 115-*b* over the relay link 210-*a* and the relay link 210-*b* respectively, and the UE 115-*a* and the UE 115-*b* may relay or forward (e.g., transmit, retransmit) the information to the UE 115-*d* over the sidelink link 205-*a* and the sidelink link 205-*b* respectively. The UE 115-*a* and the UE 115-*b* may also transmit additional information (e.g., one or more data or control messages originating at the UEs 115) to the network entity 105 via the relay link 210-*a* and the relay link 210-*b* (e.g., the direct link).

In some cases, the UE 115-*a* and the UE 115-*b* (e.g., the relay UEs) may operate in Mode 1 resource allocation, where sidelink coordination across the UE 115-*a* and the UE 115-*b* may be determined by the network entity 105-*a*. Additionally or alternatively, in Mode 2 resource allocation, sidelink coordination across relays may be determined by the relay UEs (e.g., a primary relay UE of the UEs 115) or a network device (e.g., a network entity 105). Some wireless communications techniques may fail to provide for managing the transmissions across multiple relay UEs in a group of relay UEs (e.g., a relay group).

Aspects of the present disclosure provide for techniques for a network entity to signal relay operation to relay UEs and remote UEs in a multiple relay configuration using Mode 1 resource allocation or Mode 2 resource allocation. In some cases, either operation mode (e.g., Mode 1 or Mode 2) may support a transmission of sSCI, where transmissions may be SDMed, TDMed, or FDMed, or mSCI. For sSCI transmissions, a UE 115-*a* (e.g., a first relay UE) may transmit a PSSCH 220 and a PSCCH 230, while a UE 115-*b* (e.g., a second relay UE) may transmit a PSSCH 225. That is, one relay UE may transmit an sSCI and the PSCCH, while both relay UEs may transmit PSSCH. In some cases, for sSCI transmissions, the UE 115-*b* may transmit the PSSCH 225 and a PSCCH, while the UE 115-*a* may transmit PSSCH 220. For both sSCI and mSCI examples, transmissions may be SDMed, TDMed, or FDMed.

In some examples, for mSCI, each relay UE may transmit PSSCH and PSCCH. For example, the UE 115-*a* may transmit the PSSCH 220 and the PSCCH 230, and the UE 115-*b* may transmit the PSSCH 225 and a PSCCH. In some cases, the network entity 105-*a* may assign sidelink transmissions to be fully overlapping, partially overlapping, or non-overlapping. In some cases, the location of demodulation reference signal (DMRS) symbols may be the same. Additionally or alternatively, different code division multiplexing (CDM) groups may be used by different relay UEs.

According to one or more aspects of the present disclosure, a UE 115-*a* may identify a configuration for multiple path relaying. For example, the multiple path relaying may include a first path between the network entity 105-*a* and the UE 115-*d* via the UE 115-*a* and a second path between the network entity 105-*a* and the UE 115-*d* via the UE 115-*b*. In some cases, the UE 115-*a* may receive a configuration from the network entity 105-*a* indicating whether the UE 115-*a* is associated with sSCI or mSCI. The UE 115-*a* may determine a first set of resources for the first path and a second set of resources for the second path based on the configuration. For example, the UE 115-*a* may transmit control information in a physical sidelink control channel. The control information in the physical sidelink control channel may indicate data transmission on the first set of resources (to be transmitted by the UE 115-*a*) and data transmission on the second set of resources (to be transmitted by the UE 115-*b*).

The UE 115-*a*, in some instances, may receive data for the UE 115-*d* on the first set of resources. In some examples, the UE 115-*a* may receive the data from the network entity 105-*a*. The UE 115-*a* may then transmit the data to the UE 115-*d* on the first set of resources. In some cases, the UE 115-*a* may transmit, to the UE 115-*d*, control information for both data for the UE 115-*d* on the first set of resources for the first path and data for the UE 115-*d* on the second set of resources for the second path. The UE 115-*a* may transmit the common control information and the data for the UE 115-*d* on the first set of resources for the first path. The UE 115-*b* may transmit the data for the UE 115-*d* on the second set of resources for the second path.

In some cases, under Mode 1 resource allocation, the network entity 105-*a* may form a group of relay UEs (e.g., including the UE 115-*a* and the UE 115-*b*). The group of relay UEs may be identified by a single radio network temporary identifier (RNTI) for wireless communications, a single source and destination ID for sidelink operation, or both, for example over a Uu interface. The Uu interface may refer to an over-the-air interface between a UE 115 and the network entity 105-*a* for downlink transmissions, uplink transmissions, or both. In the case of a single RNTI for Uu operation, the network entity 105-*a* may use a group common DCI to schedule the sidelink transmissions of the UEs 115 (e.g., the member relay UEs). The DCI format may include parameters such as an MCS and an RV index, among others. In both cases, the DCI may explicitly or implicitly indicate to the UEs 115 in the group of relay UEs that a grant may be used for the transport block (TB) transmission to a remote UE (e.g., the UE 115-*d*). For example, the DCI may include an ID of the remote UE. A given relay UE may use the ID of the remote UE to schedule sidelink transmissions with the remote UE.

For each group of relay UEs, a network entity 105-*a* may indicate a configuration 235 of the operation mode to the relay UEs (e.g., the UE 115-*a* and the UE 115-*b*) either dynamically (e.g., using a MAC-CE or DCI) or semi-statically (e.g., using RRC signaling) using the relay link 210-*a* and the relay link 210-*b*. For example, for sSCI and mSCI operation, the indication may be dynamic (e.g., DCI). In some cases, for sSCI, the network entity 105-*a* may indicate which relay UE may transmit PSCCH and PSSCH, and which relay UE may transmit PSSCH only. In some cases, the network entity 105-*a* may indicate whether the transmissions may be FDMed or TDMed (e.g., inter-slot or intra-slot), which is further described herein with reference to FIGS. 3 and 4.

For FDMed transmissions, the network entity 105-*a* may indicate resource allocation portions to be used by each relay UE. For TDMed transmissions, the network entity 105-*a* may indicate the order of transmissions by the UE 115-*a* and the UE 115-*b* (e.g., the pattern of relay UEs switching across time). For example, the configuration transmitted by the network entity 105-*a* may indicate that the first set of resources (allocated for the first UE) is FDMed with the second set of resources (allocated for the second UE), TDMed with the second set of resources, SDMed with the second set of resources, or any combination thereof. In some cases, the network entity 105-*a* may transmit a control signal comprising the configuration indicating the first set of resources for the UE 115-*a* and the second set of resources for the UE 115-*b*.

Figure 5:
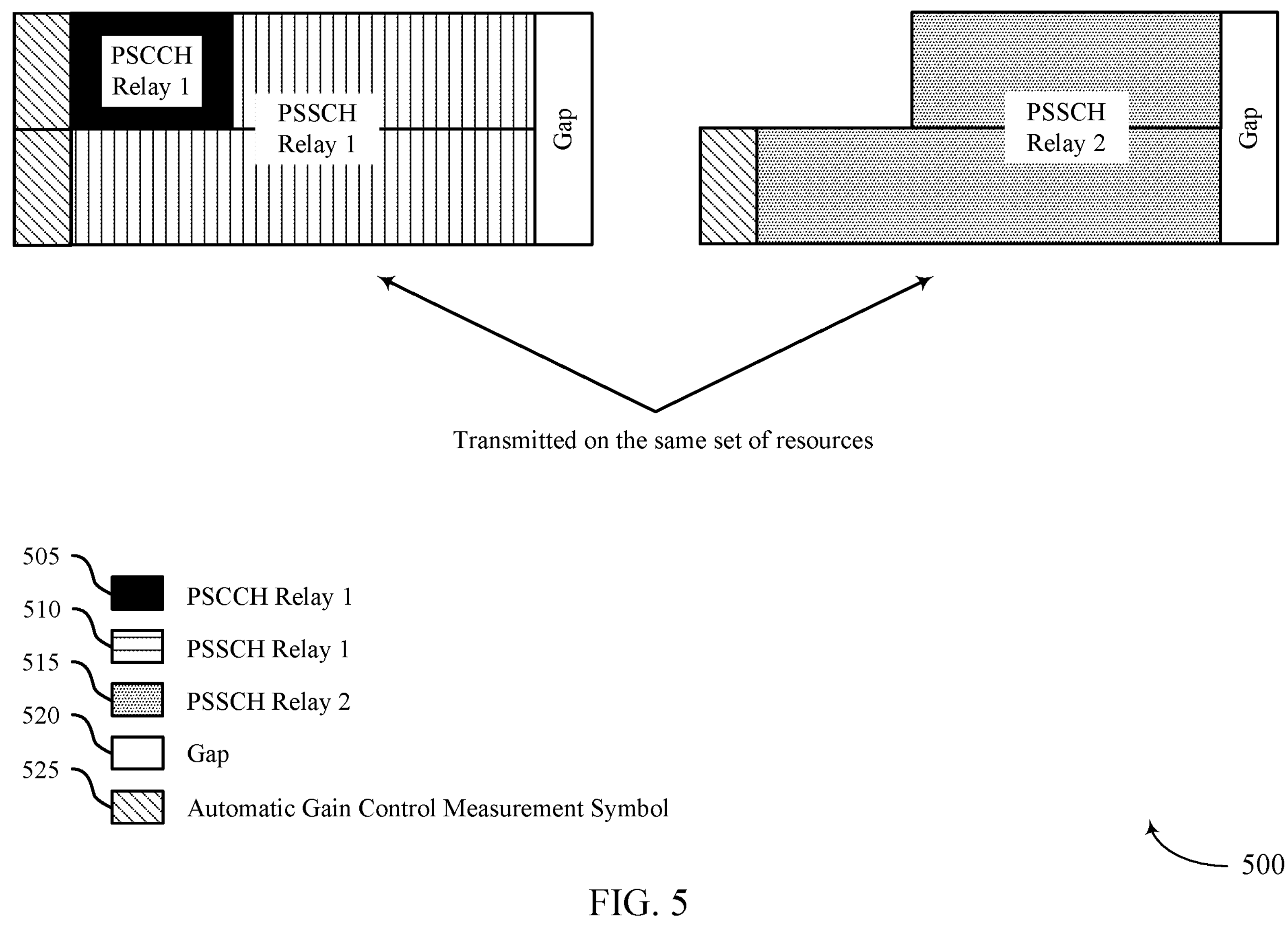
FIG. 5 illustrates an example of a resource configuration that supports spatial diversity in sidelink communications in accordance with aspects of the present disclosure.

In some cases, the network entity 105-*a* may indicate the operation mode to the UEs 115 either dynamically or semi-statically, and may indicate that the transmissions may be SDMed, which is further described herein with reference to FIG. 5. For SDMed transmissions, the network entity 105-*a* may indicate a DMRS CDM group assignment for each UE 115. In such cases, the UE 115-*a* may identify a DMRS CDM group assignment for the UE 115-*a* according to the configuration transmitted by the network entity 105-*a*. In some cases, the network entity 105-*a* may also indicate which UE 115 may report sidelink HARQ (e.g., and other uplink control information (UCI) types, such as CSI) back to the network entity 105-*a*. The UE 115-*a* may transmit a sidelink acknowledgement feedback to the network entity 105-*a* based on the configuration indicating that the UE 115-*a* is configured to report the sidelink acknowledgement feedback. Additionally or alternatively, the UE 115-*a* may monitor a sidelink feedback channel associated with the data based on identifying that UE 115-*a* is configured to report the sidelink acknowledgement feedback.

In some examples, for mSCI, a first SCI (e.g., SCI1) sent over sidelink transmissions may indicate a PSSCH DMRS pattern if multiple patterns are configured for a resource pool. For example, if there are four available patterns, the transmitting device (e.g., the network entity 105-*a*) may indicate (e.g., to a receiving device) one pattern to use. In some cases, the network entity 105-*a* may configure one or multiple patterns for the group of relay UEs via RRC signaling. The configuration may be common for one group of relay UEs per destination ID (e.g., the ID of the UE 115-*d*). In some cases, the network entity 105-*a* may also indicate a DMRS group per relay UE. For PSCCH, DMRS may be present on every symbol with one fourth density. A frequency domain (FD) orthogonal cover code (FD-OCC) may be used across DMRS resource elements (REs) of one symbol. In some cases, a UE 115 (e.g., a sidelink transmitting UE) may choose the DMRS at random, and the network entity 105-*a* may indicate to each UE 115 which PSSCH OCC sequence to use. In some cases, the UE 115-*a* may apply the OCC to the data it may transmit to the UE 115-*d* on the first set of resources.

For transmissions supporting sSCI and/or mSCI, the network entity 105-*a* may indicate a number of parameters to the UEs 115 (e.g., which may be set the same for the UE 115-*a* and the UE 115-*b*). The parameters may include an MCS, an RV index, the number of layers for transmission, a new data indicator (NDI) and HARQ process number, an indication of presence of frequency hopping (e.g., whether there is frequency hopping, and if so, which frequency hopping pattern is used), a physical uplink control channel (PUCCH) for reporting sidelink HARQ (e.g., which may be used by one relay UE, such as the primary relay UE in a group of relay UEs), a time gap between receiving the DCI and the sidelink transmission (e.g., sl-DCI-ToSL-Trans), a time gap between receiving a physical sidelink feedback channel (PSFCH) and transmitting a PUCCH (e.g., sl-PSFCH-ToPUCCH), which may be used by a UE 115 reporting HARQ, a counter sidelink assignment indicator (SAI) (e.g., which may be used by a UE 115 reporting HARQ), or any combination thereof. In some examples, the time gap between receiving the DCI and the sidelink transmission may be the same for all UEs 115 in sSCI operations. Additionally or alternatively, the time gap between receiving a PSFCH and transmitting a PUCCH may be used by a UE 115 reporting HARQ. In some cases, the counter SAI may help the receiving device align the number of bits as expected to form a HARQ codebook. In some cases, one UE 115 may report sidelink HARQ back to the network entity 105-*a*, and other UEs 115 in the group of relay UEs may refrain from monitoring for a PSFCH associated with a TB transmission under sSCI operation.

In some cases, the UEs 115 may operate in a second resource allocation (e.g., Mode 2 resource allocation), where sidelink coordination across the UEs 115 may be determined by the UEs 115 (e.g., a primary relay UE of the UEs 115) or a network (e.g., network entity 105-*a*) for both sSCI and mSCI scenarios. Under Mode 2 resource allocation, the sidelink nodes (e.g., the UEs 115) with a capability for supporting any joint transmission mode may identify each other (e.g., as a part of a discovery process using sidelink links 215). For operation under any of the modes, the UEs 115 may be identified through a single source or destination ID.

In some cases, for transmitting an sSCI, one UE 115 (e.g., a UE 115-*c*, a source UE) may become the primary relay UE. The primary relay UE may be determined by the network or may be negotiated across the UEs 115 in a group of relay UEs. For example, the UE 115-*a*, the UE 115-*b*, and a UE 115-*c* (e.g., a source UE) may negotiate over a sidelink link 215-*a*, a sidelink link 215-*b*, and a sidelink link 215-*c* (e.g., via PC5 RRC signaling). In some cases, a UE 115 with a reference signal received power (RSRP) satisfying a threshold (e.g., an RSRP to the network entity 105-*a*, the UE 115-*d*, or both) may be selected as the primary relay UE. In some cases, the primary relay UE may be selected based on the individual ID of each UE 115 (e.g., the UE 115 with the smallest or largest ID may be selected). In some cases, the primary relay UE (e.g., the UE 115-*c*) may transmit PSCCH and PSSCH, or may assign the role of PSCCH transmission to one of the UEs 115 in the group of relay UEs, such as the UE 115-*a* or the UE 115-*b*. In some cases, the role of PSCCH transmission may be assigned by negotiations as part of a PC5 link setup (e.g., the sidelink links 215) between the UEs 115. In some examples, the primary relay UE (e.g., the source UE 115-*c*) may decide the mode of operation (e.g., FDM, TDM, SDM), and may indicate the mode to the other UEs 115 in the same group of relay UEs or via negotiation.

For transmissions supporting sSCI and/or mSCI, the UE 115-*c* (e.g., the primary relay UE) may indicate to the UEs 115 the setting of a number of parameters (e.g., which may be set the same for the UE 115-*a* and the UE 115-*b*). Additionally or alternatively, in Mode 2 resource allocation, the network entity 105-*a* may set the parameters for the group of relay UEs. For example, the network entity 105-*a* may transmit the configuration 235 to the UE 115-*a* and the UE 115-*b*, which may indicate the parameters. The parameters may include an MSC, an RV index, the number of layers for transmission, an NDI and HARQ process number, an indication of frequency hopping (e.g., whether there is frequency hopping, and if so, which frequency hopping pattern is used), a PUCCH for reporting sidelink HARQ (e.g., which may be used by one relay UE, such as the primary relay UE), a time gap between receiving the DCI and the sidelink transmission (e.g., sl-DCI-ToSL-Trans) which may be the same for all UEs 115 in sSCI operations, a time gap between receiving a PSFCH and transmitting a PUCCH (e.g., sl-PSFCH-ToPUCCH), which may be used by a UE 115 reporting HARQ, a counter SAI, which may be used by a UE 115 reporting HARQ, or any combination thereof.

In some cases, under both Mode 1 resource allocation and Mode 2 resource allocation for the group relay-to-remote UE link, the UE 115-*d* may be aware of the operation modes. In some cases, the parameters indicated to the UEs 115 in a group of relay UEs may be indicated to the UE 115-*d* served by the same group of relay UEs. The indication may be via PC5 RRC signaling and may be initiated by the network entity 105-*a* or the primary relay UE (e.g., the UE 115-*c*) designated by the group of relay UEs. In some cases, the indication to the UE 115-*d* may be a function of an ID assigned to a group of relay UEs. As such, the same UE 115-*d* may operate differently when served by different group of relay UEs.

In some examples, under Mode 1 resource allocation, the network entity 105-*a* may assign all resources for relay group-to-UE communications. However, under Mode 2 resource allocation, resources may be selected by sensing and reservation. For transmissions supporting sSCI with FDM, TDM, SDM, or any combination thereof, the resources for transmissions may be coordinated. In some examples, the selection of mSCI and sSCI as well as the sub-modes of sSCI may be semi-static. In such cases, and in the case where UEs 115 in a group of relay UEs are configured to perform mSCI operation, each UE 115 may reserve resources for its own transmissions independently. The DMRS configuration, number of symbols, and location may also be coordinated for transmissions, and if coordinated correctly (e.g., prior to the transmissions), the UE 115-*d* may decode all transmissions fully even if the transmissions partially or fully overlap.

In some cases, the configuration may include using the same DMRS pattern (e.g., the number of DMRS symbols and their locations is the same) and using different ports within the same CDM group for transmission. The UE 115-*d* being coordinated correctly may mean that a same DMRS pattern is used by the relay UEs. In some examples, if different CDM groups are used, each relay UE 115 may be aware of the CDM group used by the other relay UEs 115 *g* for the purpose of rate-matching. In some cases, the relay UEs 115 in a group of relay UEs may be configured to perform sSCI operations, where one relay UE 115 may select resources and indicate the reservations to the other relay UEs 115 in the group of relay UEs so they may transmit together. In some cases, the UEs 115 may be configured to perform dynamic switching between mSCI and sSCI and across sub-modes of sSCI. For example, the UE 115-*a* may receive an indication to switch from a first sidelink control mode to a second sidelink control mode, where first sidelink control mode may be associated with sSCI and the second sidelink control mode may be associated with mSCI. The UE 115-*a* may then transmit data according to the second sidelink control mode based on receiving the indication to switch from the first sidelink control mode to the second sidelink control mode.

In some cases, under Mode 2 resource allocation, the UEs 115 may be configured to perform dynamic switching between sSCI and mSCI. Each UE 115 may perform sensing and resource selection for its own, independent transmissions. In some examples, each UE 115 may be part of a group of relay UEs and may have their own identities. For example, each UE 115 may be a part of the group of relay UEs and may utilize multiple UEs 115 to transmit to a UE 115-*d*, otherwise communicating independently with other UEs 115. In some cases, for TBs that may be transmitted using sSCI, one relay UE (e.g., the UE 115-*a*) may select resources and indicate the resources to other UEs 115 in the group of relay UEs. In some cases, a secondary relay UE (e.g., the relay UE 115-*b*) may perform sensing for mSCI transmissions and may rely on resources indicated by the primary relay UE (e.g., the UE 115-*c*) in the group of relay UEs for sSCI transmissions. In some cases, the UE 115-*a* may perform a channel sensing operation and may transmit, to the UE 115-*b*, a channel reservation for the first set of resources for transmitting data to the UE 115-*d* based on the channel sensing operation.

Figure 3:
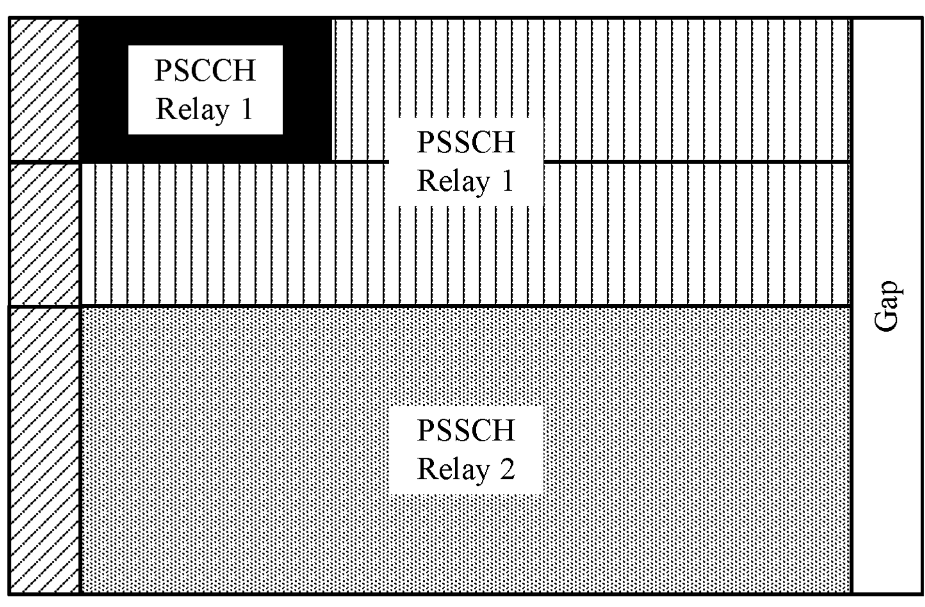
FIG. 3 illustrates an example of a resource configuration that supports spatial diversity in sidelink communications in accordance with aspects of the present disclosure.
Figure 3:
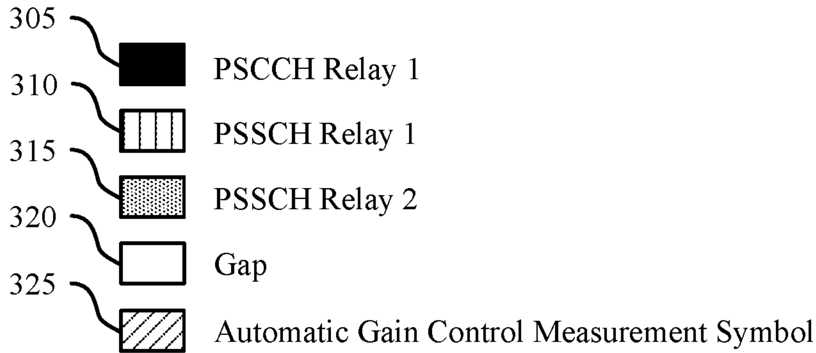

FIG. 3 illustrates an example of a resource configuration 300 that supports spatial diversity in sidelink communications in accordance with aspects of the present disclosure. In some examples, the resource configuration 300 may implement, or be implemented by, aspects of wireless communications systems 100 and 200. For example, the resource configuration 300 may be implemented by a network entity 105 and a UE 115, which may be examples of corresponding devices described herein with reference to FIG. 2.

In some cases, the network entity 105 and UEs 115 (e.g., relay UEs including the UE 115-*a*, the UE 115-*b*, and the UE 115-*c*, and a remote UE including the UE 115-*d*, as described herein with reference to FIG. 2) may utilize multiple path relaying between the relay UEs (e.g., a first UE 115, a second UE 115) and a remote UE (e.g., a third UE 115) using Mode 1 resource allocation and Mode 2 resource allocation. In Mode 1 resource allocation and Mode 2 resource allocation, the network entity 105 may indicate configurations for sSCI and mSCI operations to each relay UE dynamically (e.g., using a MAC-CE or DCI) or semi-statically (e.g., using RRC signaling).

In some cases, the network entity 105 may transmit a configuration to the UEs 115 indicating that the first set of resources (allocated for the UE 115-*a*) is FDMed with the second set of resources (allocated for the UE 115-*b*). For example, for sSCI, the transmissions may be FDMed, where one relay UE 115 (e.g., the UE 115-*a* as described in FIG. 2) may transmit a PSCCH 305 (e.g., a control channel). If the transmissions from a first UE 115 (e.g., the UE 115-*a* as described in FIG. 2, a first relay UE) and a second UE 115 (e.g., the UE 115-*b* as described in FIG. 2) are coordinated, then each UE 115 may identify an indication of a location for transmitting their respective data. For example, the first UE 115 may transmit a PSSCH 310 and the second UE 115 may transmit a PSSCH 315. In some cases, the information identifying the location for data transmission (e.g., the resource configuration) may be known by a third UE 115 (e.g., a remote UE) so it may attempt to decode the transmissions from the first and second UEs 115. In some cases, the resource configuration 300 may include a gap symbol 320 (e.g., between different slots) and an automatic gain control measurement symbol 325.

Figure 4A:
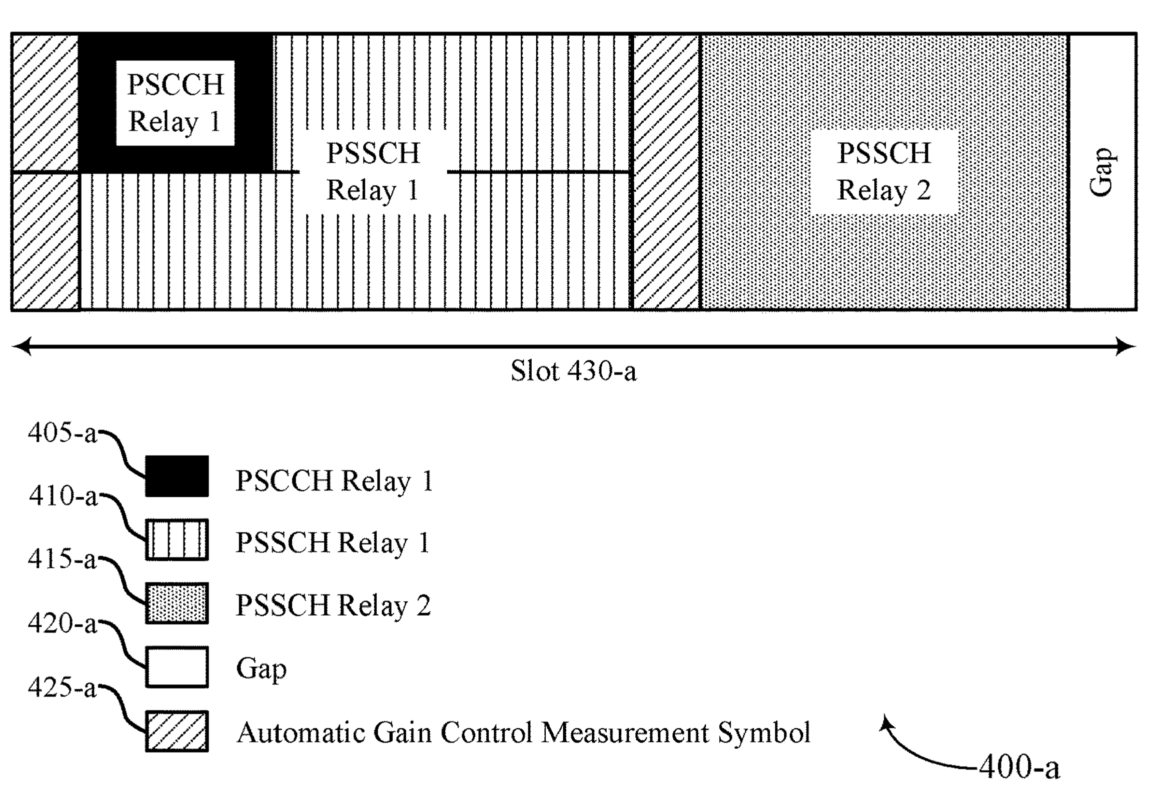
FIGS. 4A and 4B illustrate examples of resource configurations that support spatial diversity in sidelink communications in accordance with aspects of the present disclosure.
Figure 4B:
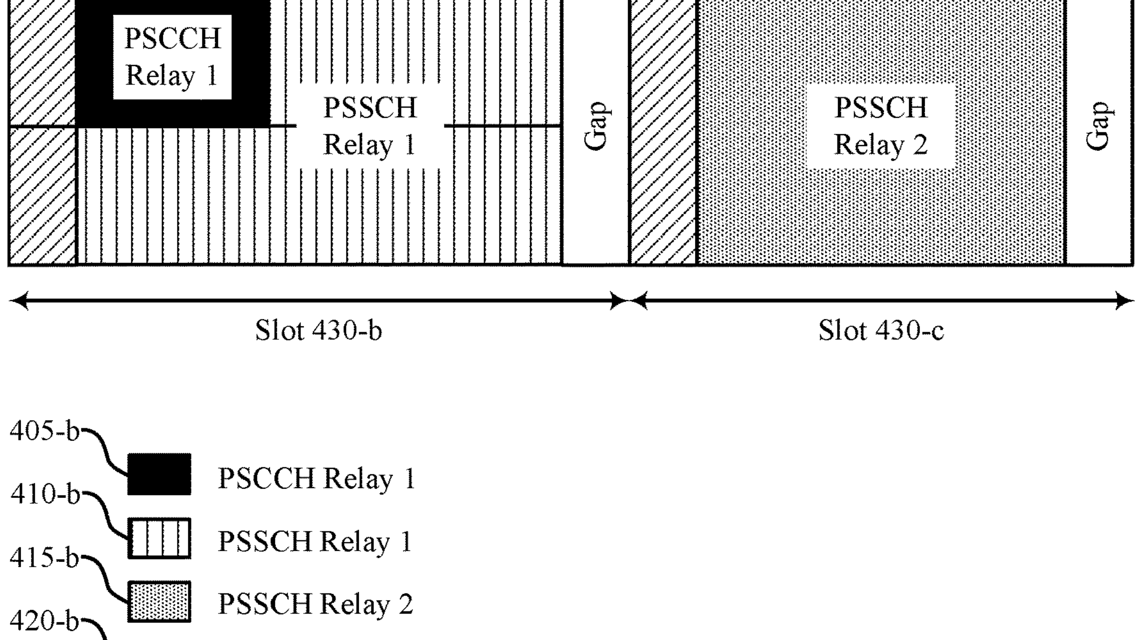

FIGS. 4A and 4B illustrate examples of resource configuration 400-*a* and resource configuration 400-*b* that support spatial diversity in sidelink communications in accordance with aspects of the present disclosure. In some examples, the resource configuration 400-*a* and the resource configuration 400-*b* may implement, or be implemented by, aspects of wireless communications systems 100 and 200. For example, the resource configuration 400-*a* and the resource configuration 400-*b* may be implemented by a network entity 105 and a UE 115, which may be examples of corresponding devices described herein with reference to FIG. 2.

In some cases, the network entity 105 and UEs 115 (e.g., relay UEs including the UE 115-*a*, the UE 115-*b*, and the UE 115-*c*, and a remote UE including the UE 115-*d*, as described herein with reference to FIG. 2) may utilize multiple path relaying between the relay UEs (e.g., a first UE 115, a second UE 115) and the remote UE (e.g., a third UE 115) using Mode 1 resource allocation and Mode 2 resource allocation. In some cases, under Mode 1 resource allocation and Mode 2 resource allocation, the network entity 105 may indicate configurations for sSCI and mSCI operations to each relay UE dynamically (e.g., using a MAC-CE or DCI) or semi-statically (e.g., using RRC signaling).

In some examples, the network entity 105 may transmit a configuration to the UEs 115 indicating that a first set of resources (allocated for the UE 115-*a* as described herein with reference to FIG. 2) is TDMed with a second set of resources (allocated for the UE 115-*b* as described herein with reference to FIG. 2). As depicted in the example of FIG. 4A, for sSCI, the first UE 115 and the second UE 115 may utilize a single slot operation where transmissions may be TDMed within the slot 430-*a*. In some cases, the UE 115 (e.g., the UE 115-*a*, a first relay UE) may transmit a PSCCH 405-*a*, which may carry information about a PSSCH 410-*a* and a PSSCH 415-*a*. In some cases, the UE 115 may transmit the PSSCH 410-*a* in the slot 430-*a*, and a UE 115 (e.g., a second relay UE) may also transmit the PSSCH 415-*b* in slot 430-*a*. In some cases, the resource configuration 400-*a* may include a gap symbol 420-*a* between each slot, and an automatic gain control measurement symbol 425-*a* before each PSCCH 405-*a* and between the PSSCH 410-*a* and the PSSCH 415-*a* within the slot 430-*a*.

As depicted in the example of FIG. 4B, the network entity 105 may transmit a configuration to the relay UEs indicating that a first set of resources (allocated for the UE 115-*a* as described herein with reference to FIG. 2) is TDMed with a second set of resources (allocated for the UE 115-*b* as described herein with reference to FIG. 2). For sSCI, the UEs 115 may utilize an x-slot operation (where, x=a number of slots), where transmissions may be TDMed across multiple slots, such as a slot 430-*b* and a slot 430-*c*. In some cases, the first UE 115 (e.g., the UE 115-*a*) may transmit a PSCCH 405-*b*, which may carry information about a PSSCH 410-*b* in the slot 430-*b* (e.g., the current slot) and a PSSCH 415-*b* transmitted from another entity (e.g., the second UE 115) in a slot 430-*c* (e.g., a following slot). For example, the first UE 115 may transmit the PSSCH 410-*b* in the slot 430-*b*, and the second UE 115 may transmit the PSSCH 415-*b* in slot 430-*c*. In some examples, the resource configuration 400-*b* may include a gap symbol 420-*b* between each slot (e.g., between the slot 430-*b* and the slot 430-*c*), and an automatic gain control measurement symbol 425-*b* before each PSCCH 405-*b* and between the PSSCH 410-*b* in the slot 430-*b* and the PSSCH 415-*b* in the slot 430-*c*.

FIG. 5 illustrates an example of a resource configuration 500 that supports spatial diversity in sidelink communications in accordance with aspects of the present disclosure. In some examples, the resource configuration 500 may implement, or be implemented by, aspects of wireless communications systems 100 and 200. For example, the resource configuration 500 may be implemented by a network entity 105 and a UE 115, which may be examples of corresponding devices described herein with reference to FIG. 2.

In some cases, the network entity 105 and UEs 115 (e.g., relay UEs including the UE 115-*a*, the UE 115-*b*, and the UE 115-*c*, and a remote UE including the UE 115-*d*, as described herein with reference to FIG. 2) may utilize multiple path relaying between the relay UEs (e.g., a first UE 115, a second UE 115) and a remote UE (e.g., the third UE 115) using Mode 1 resource allocation and Mode 2 resource allocation. In Mode 1 resource allocation and Mode 2 resource allocation, the network entity 105 may indicate configurations for sSCI and mSCI operations to each relay UE dynamically (e.g., using a MAC-CE or DCI) or semi-statically (e.g., using RRC signaling).

In some examples, the network entity 105 may transmit a configuration to the relay UEs indicating that a first set of resources (allocated for the UE 115-*a* as described herein with reference to FIG. 2) is SDMed with a second set of resources (allocated for the UE 115-*b* as described herein with reference to FIG. 2). In some cases, for sSCI, the first UE 115 and the second UE 115 utilize a single slot operation where transmissions may be SDMed, where the first UE 115 (e.g., the UE 115-*a*, a first relay UE) and the second UE (e.g., the UE 115-*b*, a second relay UE) may be configured to simultaneously transmit using the same set of resources. In some cases, a first UE 115 (e.g., the UE 115-*a*) may transmit a PSCCH 505, which may carry information about a PSSCH 510 and a PSSCH 515. The first UE 115 may transmit the PSSCH 510 and a second UE may transmit the PSSCH 515 to the third UE 115 (e.g., a remote UE) together on the same shared set of resource blocks (RBs). In some cases, the resource configuration 500 may include a gap symbol 520 between each slot, and an automatic gain control measurement symbol 525 before each PSCCH 505 and between the PSSCH 510 and the PSSCH 515.

Figure 6:
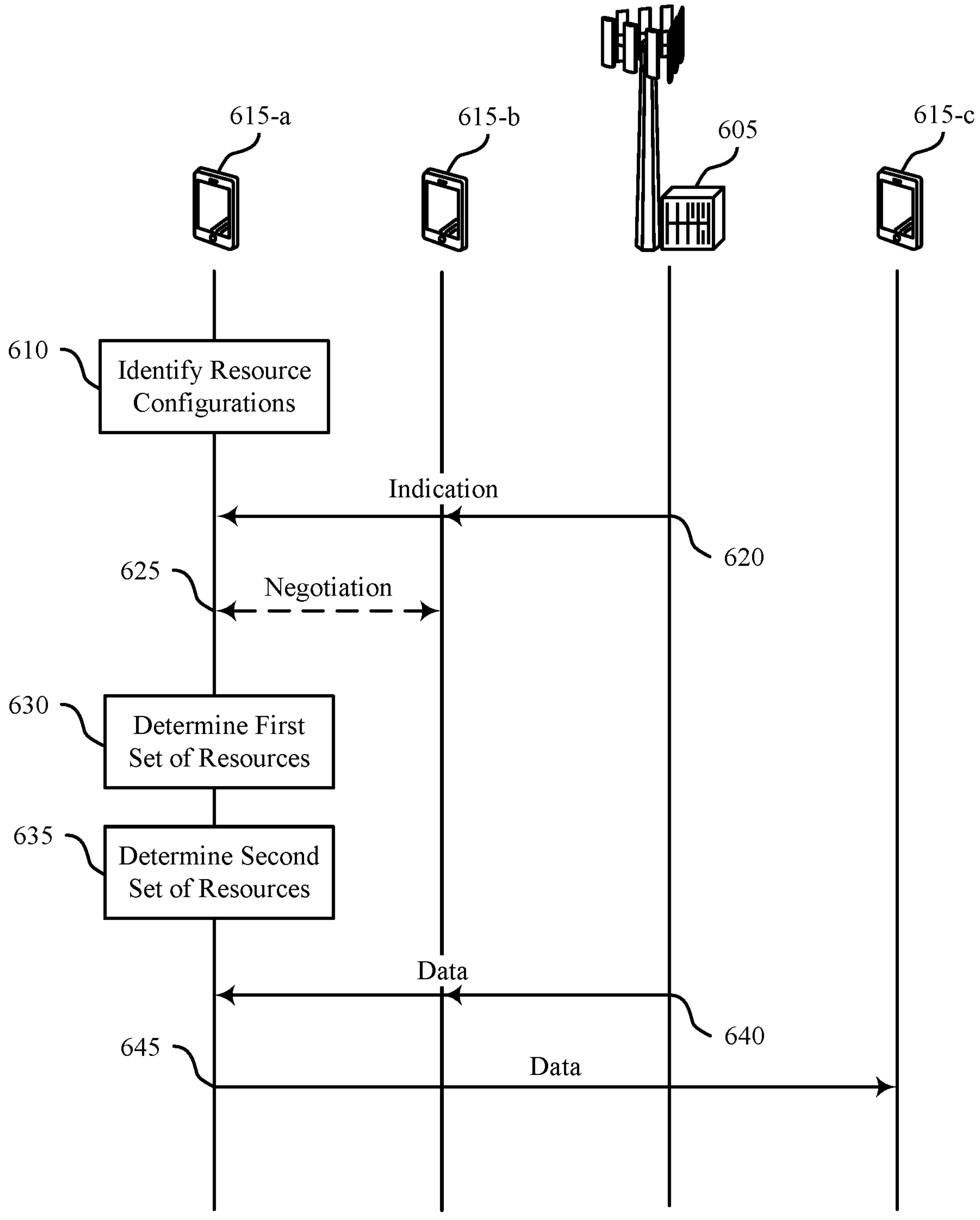
FIG. 6 illustrates an example of a process flow that supports spatial diversity in sidelink communications in accordance with aspects of the present disclosure.

FIG. 6 illustrates an example of a process flow 600 that supports spatial diversity in sidelink communications in accordance with aspects of the present disclosure. The process flow 600 may implement or be implemented by aspects of wireless communications system 100. For example, the process flow 600 may include a UE 615-*a* (e.g., a relay UE), a UE 615-*b* (e.g., a relay UE), a UE 615-*c* (e.g., a remote UE), and a network entity 605 (e.g., a wireless node), which may be examples of a UE 115 and a network entity 105 as described herein with reference to FIG. 1. In the following description of the process flow 600, the operations between the UEs 615 and the network entity 605 may be transmitted in a different order than the example order shown, or the operations performed by the UEs 615 and the network entity 605 may be performed in different orders or at different times. Some operations may also be omitted from the process flow 600, and other operations may be added to the process flow 600.

At 610, the UE 615-*a* may identify a configuration for multiple path relaying, including a first path for communications between a wireless node (e.g., the network entity 605) and the UE 615-*c* via the UE 615-*a*, and a second path for communications between the wireless node and the UE 615-*c* via a UE 615-*b*. In some cases, the multiple path relaying may operate based on a first or second mode of operation (e.g., Mode 1 resource allocation, Mode 2 resource allocation.)

At 620, the network entity 605 may transmit, to the UE 615-*a* and the UE 615-*b*, an indication of a configuration for multiple path relaying. In some cases, the multiple path relaying may include a first path between the network entity 605 and the UE 615-*c* via the UE 615-*a* and a second path between the network entity 605 and the UE 615-*c* via the UE 615-*b*. In some cases, the configuration may indicate that a first set of resources is FDMed, TDMed, or SDMed with a second set of resources, or any combination thereof. In some cases, for SDMed transmissions, the network entity 605 may indicate a DMRS CDM group assignment for each UE 615.

At 625, the UE 615-*a* and the UE 615-*b* may negotiate (e.g., via a sidelink link) to determine which UE 615 may be a primary relay UE. In some cases, the negotiation may also indicate the multiple path relaying configuration based on which UE 615 is the primary relay UE.

At 630 and 635, the UE 615-*a* may determine the first set of resources for the first path and the second set of resources for the second path based on the configuration for multiple path relaying. In some cases, the network entity 605 may assign time and frequency resources to be used by a relay group. In Mode 2 resource allocation, the UEs 615 may select resources by sensing and reservation.

At 640, the UE 615-*a* and the UE 615-*b* may receive, from the network entity 605, data for the UE 615-*c* on the first set of resources for the first path and on a second set of resources for the second path based on the configuration for multiple path relaying.

At 645, the UE 615-*a* may transmit the data to the UE 615-*c* on the first set of resources. In some cases, the UE 615-*a* may transmit control information to the UE 615-*c* for both data for the UE 615-*c* on the first set of resources from the first path or the second set of resources from the second path. In some cases, the UE 615-*a* may transmit data to the UE 615-*c* using a PSSCH OCC.

Figure 7:
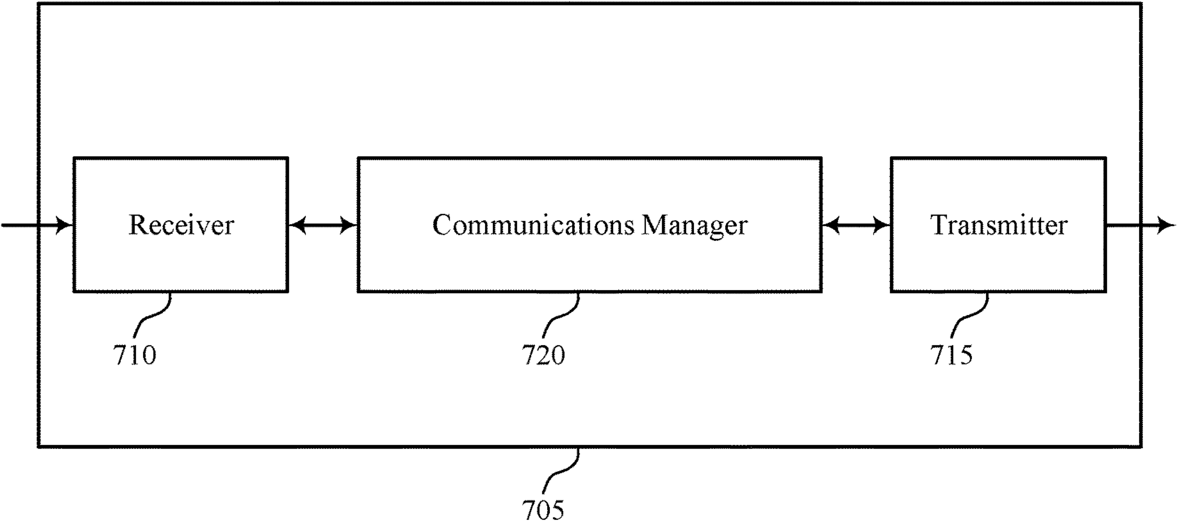
FIGS. 7 and 8 show block diagrams of devices that support spatial diversity in sidelink communications in accordance with aspects of the present disclosure.

FIG. 7 shows a block diagram 700 of a device 705 that supports spatial diversity in sidelink communications in accordance with aspects of the present disclosure. The device 705 may be an example of aspects of a UE 115 as described herein. The device 705 may include a receiver 710, a transmitter 715, and a communications manager 720. The device 705 may also include a processor (not shown). Each of these components may be in communication with one another (e.g., via one or more buses).

The receiver 710 may provide a means for receiving information such as packets, user data, control information, or any combination thereof associated with various information channels (e.g., control channels, data channels, information channels related to spatial diversity in sidelink communications). Information may be passed on to other components of the device 705. The receiver 710 may utilize a single antenna or a set of multiple antennas (not shown).

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to spatial diversity in sidelink communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of spatial diversity in sidelink communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. For example, the communications manager 720 may be configured as or otherwise support a means for identifying a configuration for multiple path relaying, the multiple path relaying including a first path for communications between a wireless node and a second UE via the first UE and a second path for communications between the wireless node and the second UE via a third UE. The communications manager 720 may be configured as or otherwise support a means for determining a first set of resources for the first path based on the configuration for the multiple path relaying. The communications manager 720 may be configured as or otherwise support a means for determining a second set of resources for the second path based on the configuration for the multiple path relaying. The communications manager 720 may be configured as or otherwise support a means for receiving, from the wireless node, data for the second UE on the first set of resources. The communications manager 720 may be configured as or otherwise support a means for transmitting the data to the second UE on the first set of resources.

By including or configuring the communications manager 720 in accordance with examples as described herein, the device 705 (e.g., a processor controlling or otherwise coupled to the receiver 710, the transmitter 715, the communications manager 720, or any combination thereof) may support techniques for spatial diversity for supporting URLLC and other applications by increasing coverage and reducing signaling overhead. Further, the multiple relay UE configuration as described herein may support higher data rates and diversity for control and data, thereby improving latency and reliability.

Figure 8:
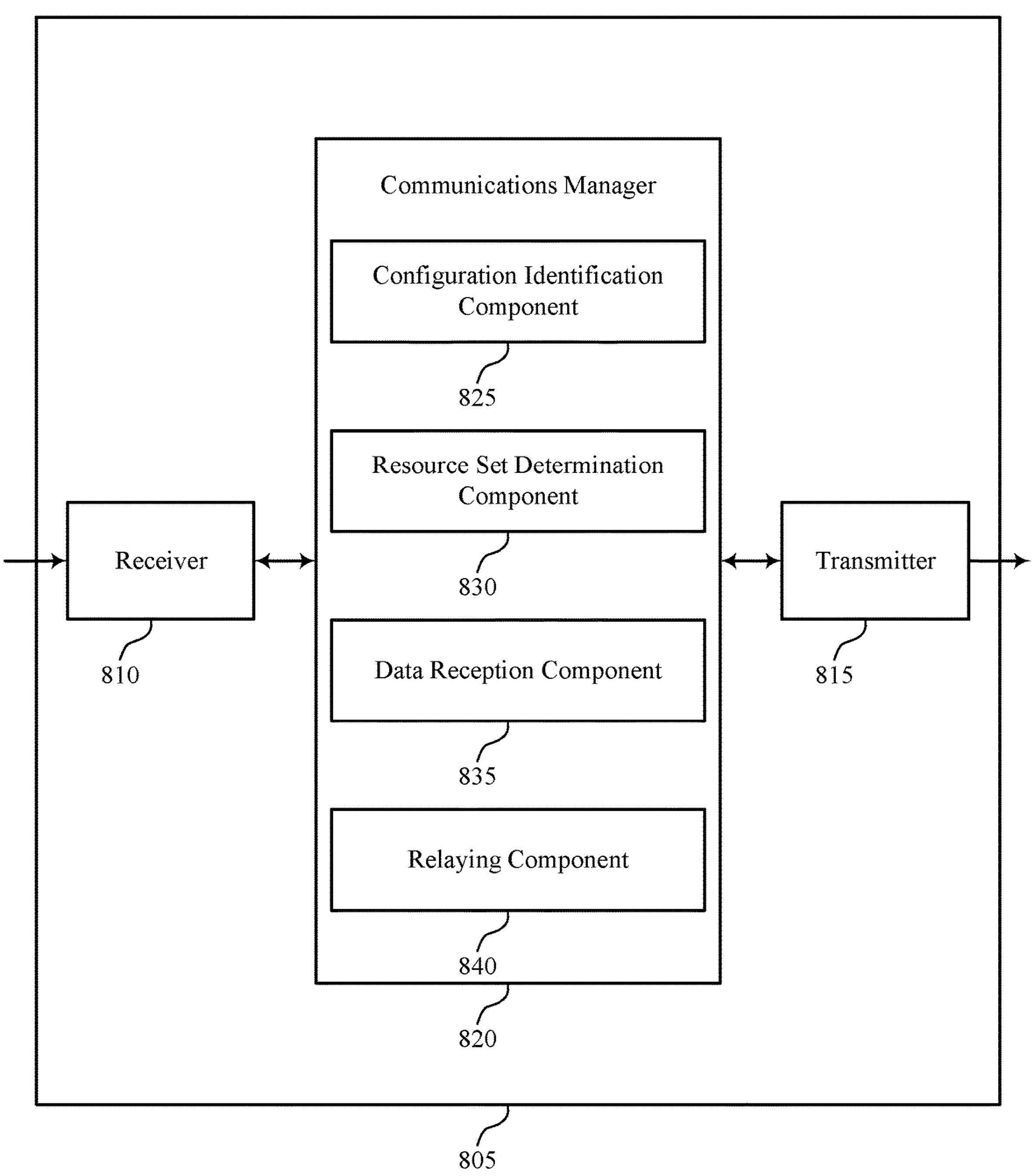

FIG. 8 shows a block diagram 800 of a device 805 that supports spatial diversity in sidelink communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor (not shown). Each of these components may be in communication with one another (e.g., via one or more buses).

The receiver 810 may provide a means for receiving information such as packets, user data, control information, or any combination thereof associated with various information channels (e.g., control channels, data channels, information channels related to spatial diversity in sidelink communications). Information may be passed on to other components of the device 805. The receiver 810 may utilize a single antenna or a set of multiple antennas (not shown).

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to spatial diversity in sidelink communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of spatial diversity in sidelink communications as described herein. For example, the communications manager 820 may include a configuration identification component 825, a resource set determination component 830, a data reception component 835, a relaying component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. The configuration identification component 825 may be configured as or otherwise support a means for identifying a configuration for multiple path relaying, the multiple path relaying including a first path for communications between a wireless node and a second UE via the first UE and a second path for communications between the wireless node and the second UE via a third UE. The resource set determination component 830 may be configured as or otherwise support a means for determining a first set of resources for the first path based on the configuration for the multiple path relaying. The resource set determination component 830 may be configured as or otherwise support a means for determining a second set of resources for the second path based on the configuration for the multiple path relaying. The data reception component 835 may be configured as or otherwise support a means for receiving, from the wireless node, data for the second UE on the first set of resources. The relaying component 840 may be configured as or otherwise support a means for transmitting the data to the second UE on the first set of resources.

Figure 9:
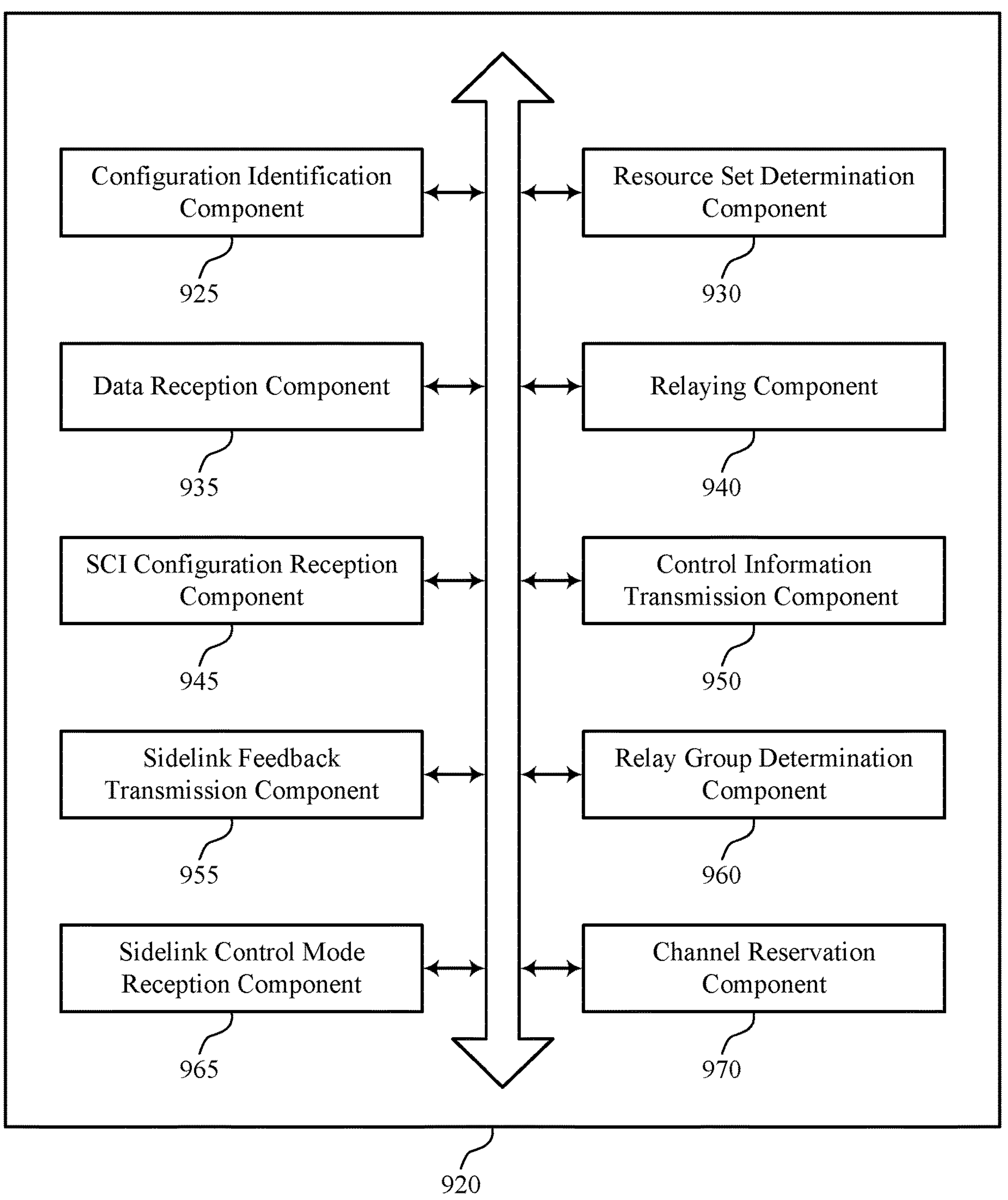
FIG. 9 shows a block diagram of a communications manager that supports spatial diversity in sidelink communications in accordance with aspects of the present disclosure.

FIG. 9 shows a block diagram 900 of a communications manager 920 that supports spatial diversity in sidelink communications in accordance with aspects of the present disclosure. The communications manager 920 may be an example of aspects of a communications manager 720, a communications manager 820, or both, as described herein. The communications manager 920, or various components thereof, may be an example of means for performing various aspects of spatial diversity in sidelink communications as described herein. For example, the communications manager 920 may include a configuration identification component 925, a resource set determination component 930, a data reception component 935, a relaying component 940, an SCI configuration reception component 945, a control information transmission component 950, a sidelink feedback transmission component 955, a relay group determination component 960, a sidelink control mode reception component 965, a channel reservation component 970, or any combination thereof. Each of these components may communicate, directly or indirectly, with one another (e.g., via one or more buses).

The communications manager 920 may support wireless communication at a first UE in accordance with examples as disclosed herein. The configuration identification component 925 may be configured as or otherwise support a means for identifying a configuration for multiple path relaying, the multiple path relaying including a first path for communications between a wireless node and a second UE via the first UE and a second path for communications between the wireless node and the second UE via a third UE. The resource set determination component 930 may be configured as or otherwise support a means for determining a first set of resources for the first path based on the configuration for the multiple path relaying. In some examples, the resource set determination component 930 may be configured as or otherwise support a means for determining a second set of resources for the second path based on the configuration for the multiple path relaying. The data reception component 935 may be configured as or otherwise support a means for receiving, from the wireless node, data for the second UE on the first set of resources. The relaying component 940 may be configured as or otherwise support a means for transmitting the data to the second UE on the first set of resources.

In some examples, to support identifying the configuration, the SCI configuration reception component 945 may be configured as or otherwise support a means for receiving the configuration from a network entity, the configuration indicating whether the first UE is associated with an sSCI or mSCI.

In some examples, the control information transmission component 950 may be configured as or otherwise support a means for transmitting control information to the second UE based on the configuration, the control information identifying both the first set of resources for the first path and the second set of resources for the second path.

In some examples, the configuration indicates that the first set of resources is FDMed with the second set of resources, TDMed with the second set of resources, SDMed with the second set of resources, or any combination thereof.

In some examples, the configuration indicates that the first set of resources is SDMed with the second set of resources, and the configuration identification component 925 may be configured as or otherwise support a means for identifying a DMRS CDM group assignment for the first UE according to the configuration.

In some examples, the sidelink feedback transmission component 955 may be configured as or otherwise support a means for transmitting a sidelink acknowledgement feedback to the wireless node based on the configuration indicating that the first UE is configured to report the sidelink acknowledgement feedback.

In some examples, the sidelink feedback transmission component 955 may be configured as or otherwise support a means for monitoring a PSFCH associated with the data based on identifying that first UE is configured to report the sidelink acknowledgement feedback.

In some examples, to support transmitting the data on the first set of resources, the relaying component 940 may be configured as or otherwise support a means for applying, based on the configuration indicating that an OCC is to be used by the first UE, the OCC to the data. In some examples, to support transmitting the data on the first set of resources, the relaying component 940 may be configured as or otherwise support a means for transmitting, to the second UE, the data on the first set of resources based on the OCC applied to the data.

In some examples, the configuration indicates at least one of an MCS, an RV index, a set of multiple layers for transmission, an NDI, a HARQ process number, an indication of frequency hopping, a PUCCH for reporting feedback, a time gap, a counter identifier, or any combination thereof. In some examples, the indication of the configuration is transmitted via RRC signaling, DCI, or a MAC CE. In some examples, the relay group determination component 960 may be configured as or otherwise support a means for determining that the first UE is included in a group of relay UEs based on the configuration, where each relay UE in the group of relay UEs is associated with a common radio network temporary identifier, or a common source and destination identifier, or both.

In some examples, the sidelink control mode reception component 965 may be configured as or otherwise support a means for receiving an indication to switch from a first sidelink control mode to a second sidelink control mode, where the first sidelink control mode is associated with an sSCI and the second sidelink control mode is associated with mSCI. In some examples, the relaying component 940 may be configured as or otherwise support a means for transmitting, to the second UE, the data according to the second sidelink control mode based on receiving the indication.

In some examples, the channel reservation component 970 may be configured as or otherwise support a means for performing a channel sensing operation. In some examples, the channel reservation component 970 may be configured as or otherwise support a means for transmitting, to the third UE based on performing the channel sensing operation, a channel reservation for the first set of resources for transmitting the data to the second UE.

In some examples, to support identifying the configuration, the configuration identification component 925 may be configured as or otherwise support a means for receiving, from a network entity, a control signal including the configuration indicating the first set of resources for the first UE and the second set of resources for the third UE.

In some examples, one or more of the first path or the second path utilize one-to-many communications from the first UE to the second UE and the third UE.

Figure 10:
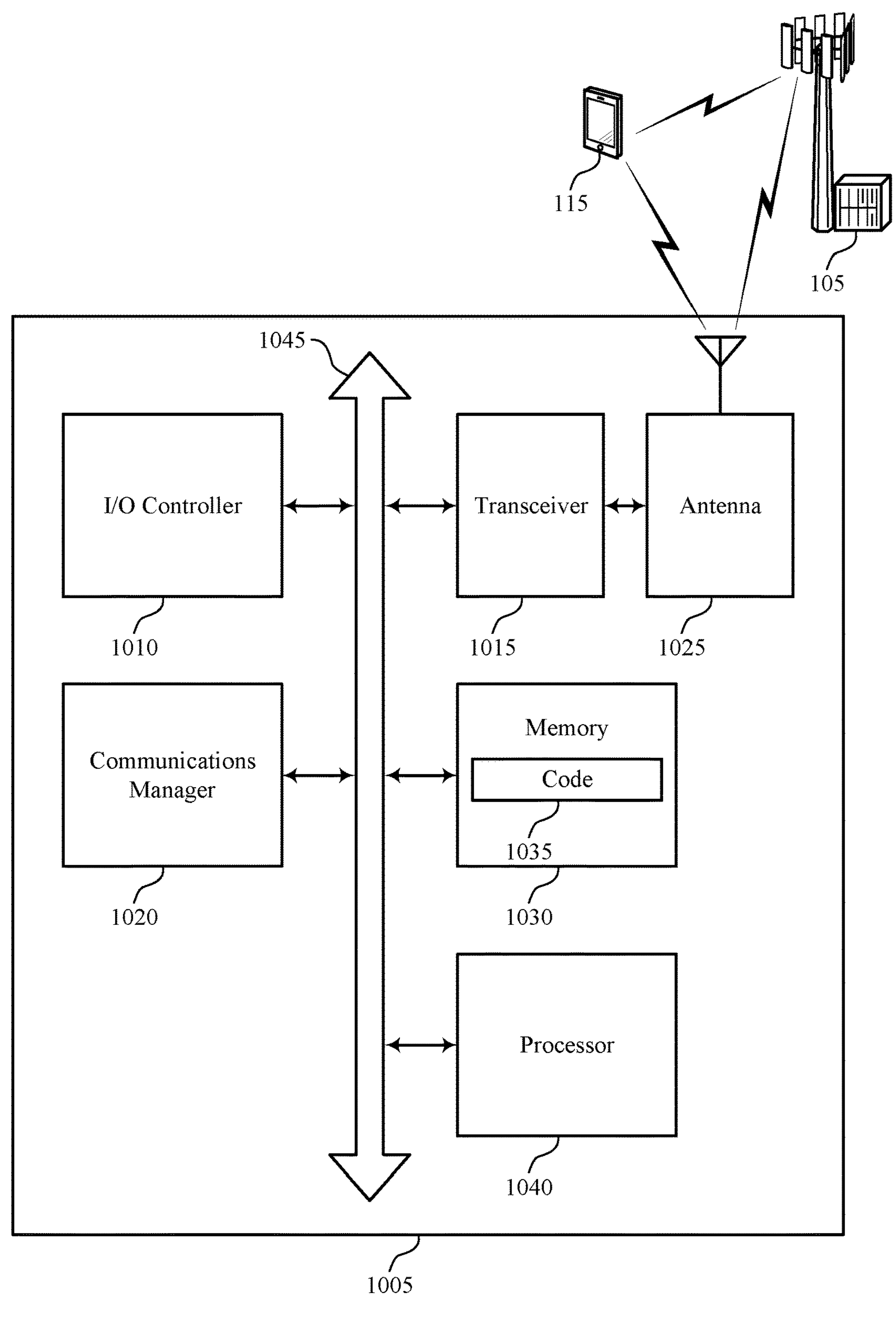
FIG. 10 shows a diagram of a system including a device that supports spatial diversity in sidelink communications in accordance with aspects of the present disclosure.

FIG. 10 shows a diagram of a system 1000 including a device 1005 that supports spatial diversity in sidelink communications in accordance with aspects of the present disclosure. The device 1005 may be an example of or include the components of a device 705, a device 805, or a UE 115 as described herein. The device 1005 may communicate wirelessly with one or more network entities 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting spatial diversity in sidelink communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for identifying a configuration for multiple path relaying, the multiple path relaying including a first path for communications between a wireless node and a second UE via the first UE and a second path for communications between the wireless node and the second UE via a third UE. The communications manager 1020 may be configured as or otherwise support a means for determining a first set of resources for the first path based on the configuration for the multiple path relaying. The communications manager 1020 may be configured as or otherwise support a means for determining a second set of resources for the second path based on the configuration for the multiple path relaying. The communications manager 1020 may be configured as or otherwise support a means for receiving, from the wireless node, data for the second UE on the first set of resources. The communications manager 1020 may be configured as or otherwise support a means for transmitting the data to the second UE on the first set of resources.

By including or configuring the communications manager 1020 in accordance with examples as described herein, the device 1005 may support techniques for spatial diversity for supporting URLLC and other applications by increasing coverage and reducing signaling overhead. Further, the multiple relay UE configuration as described herein may support higher data rates and diversity for control and data, thereby improving latency and reliability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described herein with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of spatial diversity in sidelink communications as described herein, or the processor 1040 and the memory 1030 may be otherwise configured to perform or support such operations.

Figure 11:
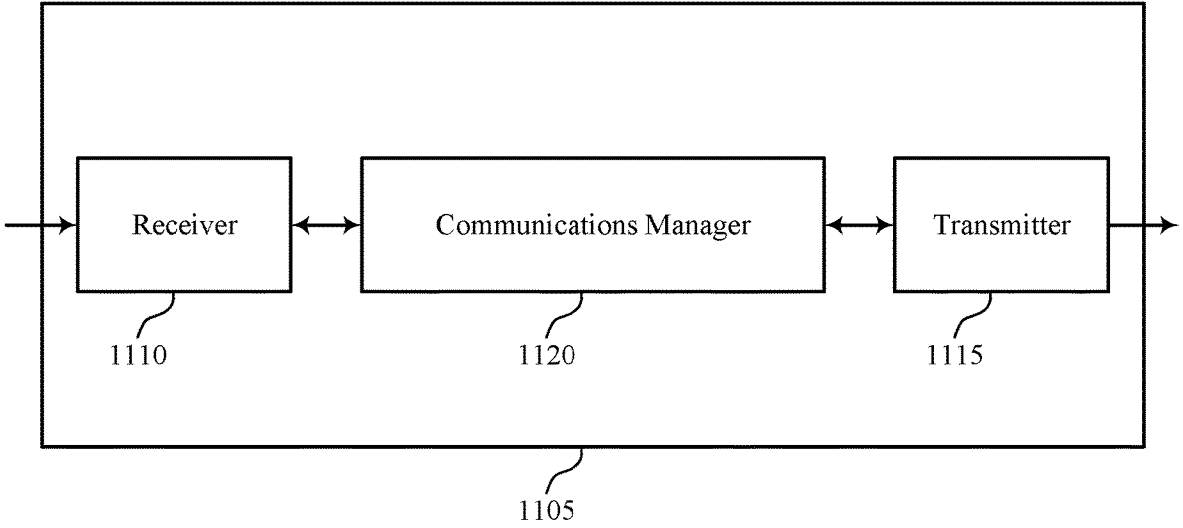
FIGS. 11 and 12 show block diagrams of devices that support spatial diversity in sidelink communications in accordance with aspects of the present disclosure.

FIG. 11 shows a block diagram 1100 of a device 1105 that supports spatial diversity in sidelink communications in accordance with aspects of the present disclosure. The device 1105 may be an example of aspects of a network entity 105 as described herein. The device 1105 may include a receiver 1110, a transmitter 1115, and a communications manager 1120. The device 1105 may also include a processor (not shown). Each of these components may be in communication with one another (e.g., via one or more buses).

The receiver 1110 may provide a means for receiving information such as packets, user data, control information, or any combination thereof associated with various information channels (e.g., control channels, data channels, information channels related to spatial diversity in sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to spatial diversity in sidelink communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of spatial diversity in sidelink communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a wireless node in accordance with examples as disclosed herein. For example, the communications manager 1120 may be configured as or otherwise support a means for transmitting, to a first UE and a second UE, an indication of a configuration for multiple path relaying, the multiple path relaying including a first path between the wireless node and a third UE via the first UE and a second path between the wireless node and the third UE via the second UE. The communications manager 1120 may be configured as or otherwise support a means for transmitting, to the first UE, data for the third UE on a first set of resources for the first path that are based on the configuration for the multiple path relaying. The communications manager 1120 may be configured as or otherwise support a means for transmitting, to the second UE, data for the third UE on a second set of resources for the second path that are based on the configuration for the multiple path relaying.

By including or configuring the communications manager 1120 in accordance with examples as described herein, the device 1105 (e.g., a processor controlling or otherwise coupled to the receiver 1110, the transmitter 1115, the communications manager 1120, or any combination thereof) may support techniques for spatial diversity for supporting URLLC and other applications by increasing coverage and reducing signaling overhead. Further, the multiple relay UE configuration as described herein may support higher data rates and diversity for control and data, thereby improving latency and reliability.

Figure 12:
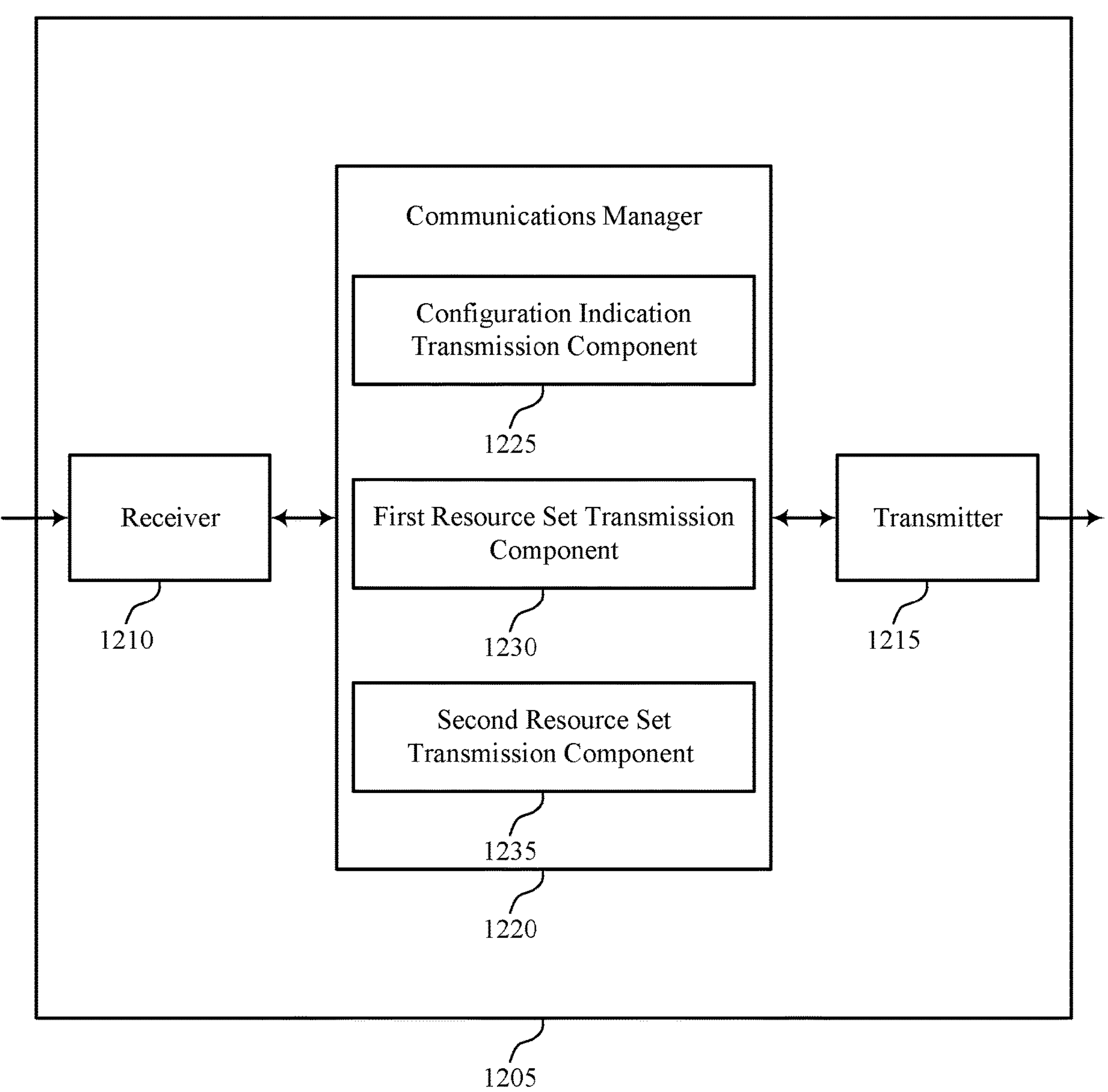

FIG. 12 shows a block diagram 1200 of a device 1205 that supports spatial diversity in sidelink communications in accordance with aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor (not shown). Each of these components may be in communication with one another (e.g., via one or more buses).

The receiver 1210 may provide a means for receiving information such as packets, user data, control information, or any combination thereof associated with various information channels (e.g., control channels, data channels, information channels related to spatial diversity in sidelink communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to spatial diversity in sidelink communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of spatial diversity in sidelink communications as described herein. For example, the communications manager 1220 may include a configuration indication transmission component 1225, a first resource set transmission component 1230, a second resource set transmission component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a wireless node in accordance with examples as disclosed herein. The configuration indication transmission component 1225 may be configured as or otherwise support a means for transmitting, to a first UE and a second UE, an indication of a configuration for multiple path relaying, the multiple path relaying including a first path between the wireless node and a third UE via the first UE and a second path between the wireless node and the third UE via the second UE. The first resource set transmission component 1230 may be configured as or otherwise support a means for transmitting, to the first UE, data for the third UE on a first set of resources for the first path that are based on the configuration for the multiple path relaying. The second resource set transmission component 1235 may be configured as or otherwise support a means for transmitting, to the second UE, data for the third UE on a second set of resources for the second path that are based on the configuration for the multiple path relaying.

Figure 13:
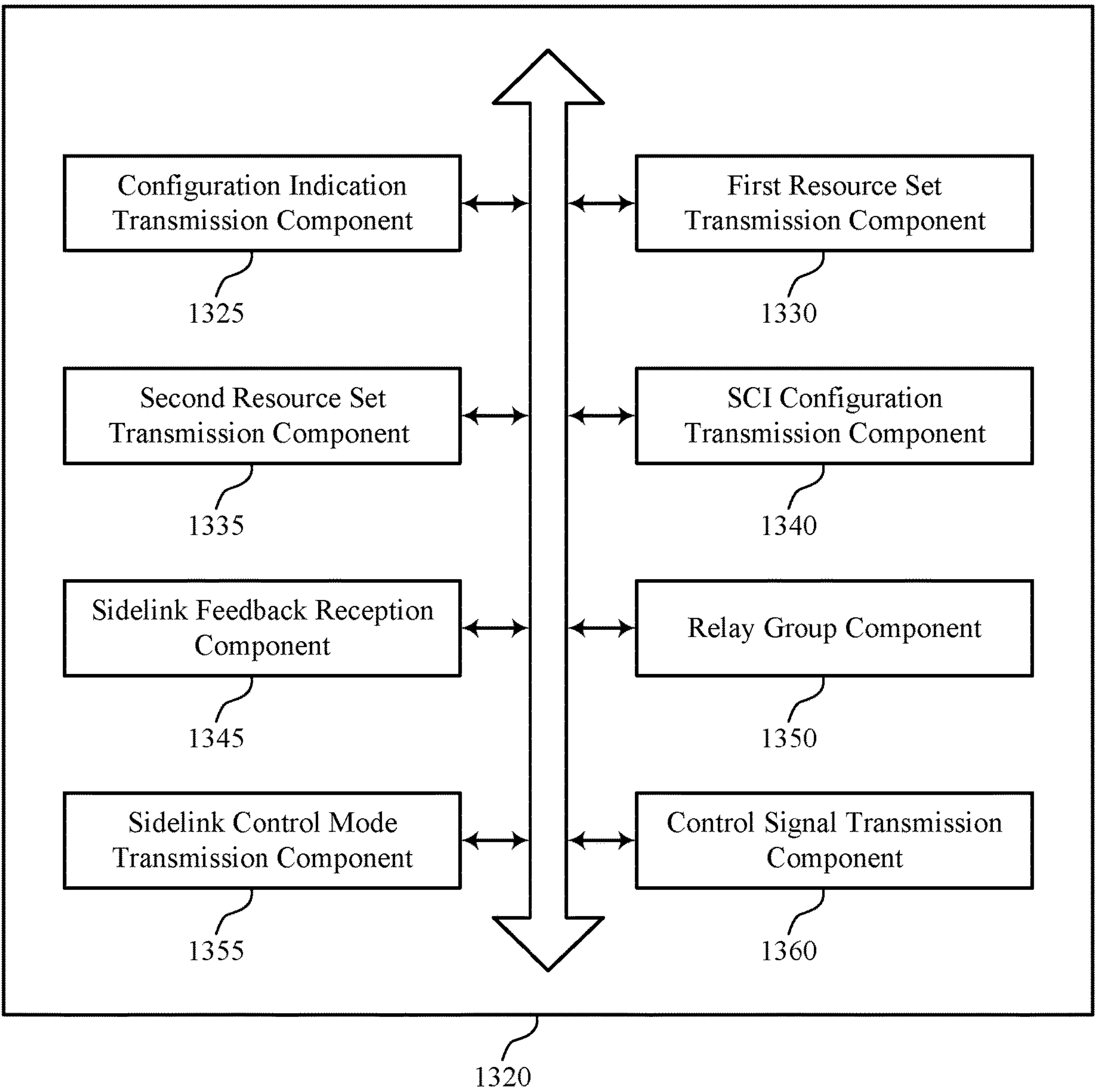
FIG. 13 shows a block diagram of a communications manager that supports spatial diversity in sidelink communications in accordance with aspects of the present disclosure.

FIG. 13 shows a block diagram 1300 of a communications manager 1320 that supports spatial diversity in sidelink communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of spatial diversity in sidelink communications as described herein. For example, the communications manager 1320 may include a configuration indication transmission component 1325, a first resource set transmission component 1330, a second resource set transmission component 1335, an SCI configuration transmission component 1340, a sidelink feedback reception component 1345, a relay group component 1350, a sidelink control mode transmission component 1355, a control signal transmission component 1360, or any combination thereof. Each of these components may communicate, directly or indirectly, with one another (e.g., via one or more buses).

The communications manager 1320 may support wireless communication at a wireless node in accordance with examples as disclosed herein. The configuration indication transmission component 1325 may be configured as or otherwise support a means for transmitting, to a first UE and a second UE, an indication of a configuration for multiple path relaying, the multiple path relaying including a first path between the wireless node and a third UE via the first UE and a second path between the wireless node and the third UE via the second UE. The first resource set transmission component 1330 may be configured as or otherwise support a means for transmitting, to the first UE, data for the third UE on a first set of resources for the first path that are based on the configuration for the multiple path relaying. The second resource set transmission component 1335 may be configured as or otherwise support a means for transmitting, to the second UE, data for the third UE on a second set of resources for the second path that are based on the configuration for the multiple path relaying.

In some examples, to support transmitting the indication of the configuration, the SCI configuration transmission component 1340 may be configured as or otherwise support a means for transmitting the indication of the configuration to the first UE, the configuration indicating whether the first UE is associated with an sSCI or mSCI.

In some examples, to support transmitting the configuration the indication of the configuration, the configuration indication transmission component 1325 may be configured as or otherwise support a means for transmitting the configuration indicating that the first UE is to transmit control information for both the data for the third UE on the first set of resources for the first path and the data for the third UE on the second set of resources for the second path.

In some examples, the configuration indicates that the first set of resources is FDMed with the second set of resources, TDMed with the second set of resources, SDMed with the second set of resources, or any combination thereof.

In some examples, the configuration indicates that the first set of resources is SDMed with the second set of resources, and the configuration indication transmission component 1325 may be configured as or otherwise support a means for identifying a DMRS CDM group assignment for the first UE according to the configuration.

In some examples, the sidelink feedback reception component 1345 may be configured as or otherwise support a means for receiving a sidelink acknowledgement feedback based on the configuration indicating that the first UE is configured to report the sidelink acknowledgement feedback.

In some examples, the configuration further indicates that a PSSCH OCC is to be used by the first UE for transmitting the data to the third UE.

In some examples, the configuration further indicates at least one of an MCS, an RV index, a set of multiple layers for transmission, an NDI, a HARQ process number, an indication of frequency hopping, a PUCCH for reporting feedback, a time gap, a counter identifier, or any combination thereof.

In some examples, the relay group component 1350 may be configured as or otherwise support a means for determining that the first UE is included in a group of relay UEs based on the configuration, where each relay UE in the group of relay UEs is associated with a common radio network temporary identifier, or a common source and destination identifier, or both.

In some examples, the sidelink control mode transmission component 1355 may be configured as or otherwise support a means for transmitting an indication to switch from a first sidelink control mode to a second sidelink control mode, where the first sidelink control mode is associated with an sSCI and the second sidelink control mode is associated with mSCI.

In some examples, to support identifying the configuration, the control signal transmission component 1360 may be configured as or otherwise support a means for transmitting, to the first UE, a first control signal including the configuration for the multiple path relaying indicating the first set of resources. In some examples, to support identifying the configuration, the control signal transmission component 1360 may be configured as or otherwise support a means for transmitting, to the second UE, a second control signal including the second set of resources for the second UE.

In some examples, to support transmitting the indication of the configuration, the SCI configuration transmission component 1340 may be configured as or otherwise support a means for transmitting the indication of the configuration comprises: transmitting the indication of the configuration of the first UE via RRC signaling, DCI, or a MAC CE.

In some examples, one or more of the first path or the second path utilize one-to-many communications from the first UE to the second UE and the third UE.

Figure 14:
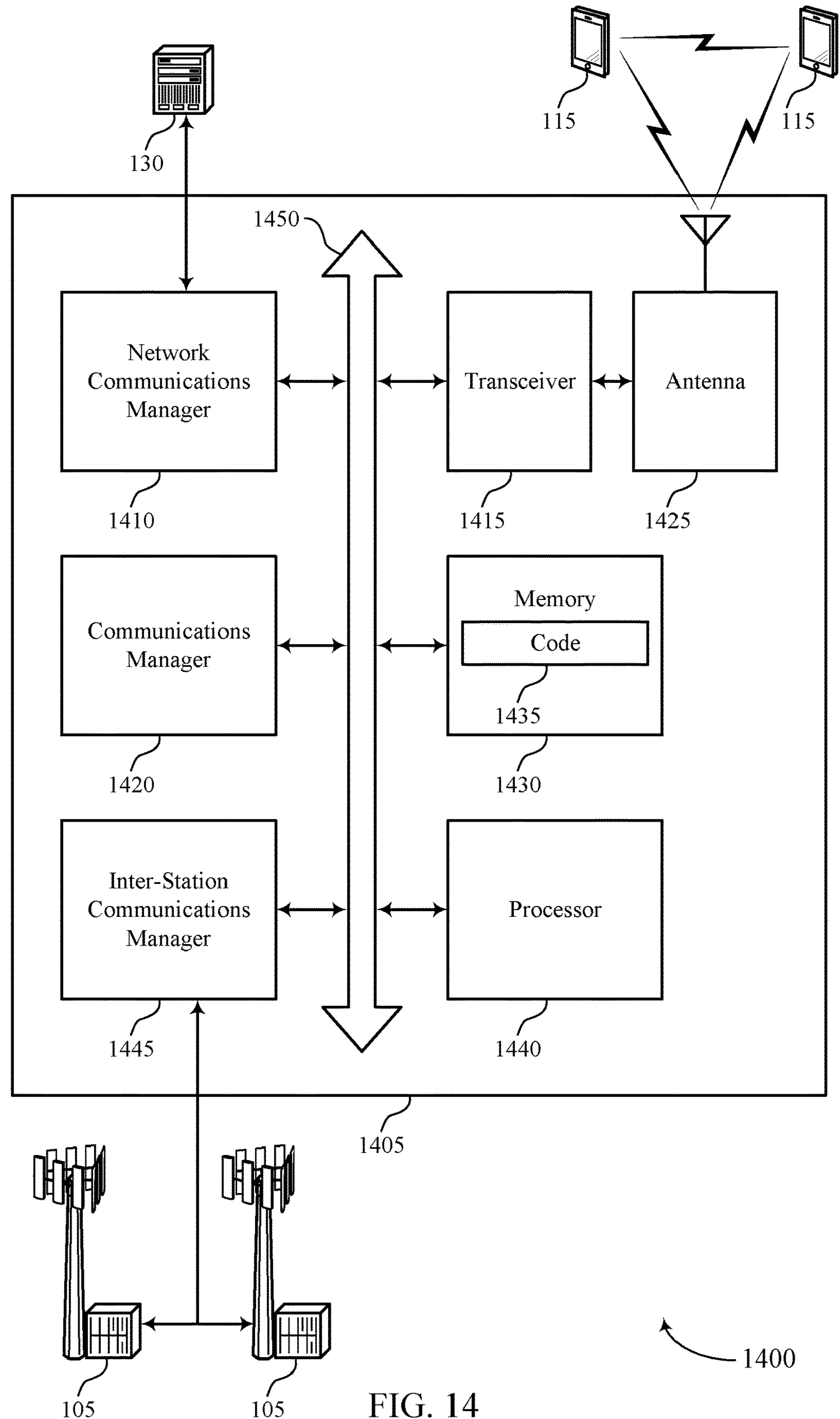
FIG. 14 shows a diagram of a system including a device that supports spatial diversity in sidelink communications in accordance with aspects of the present disclosure.

FIG. 14 shows a diagram of a system 1400 including a device 1405 that supports spatial diversity in sidelink communications in accordance with aspects of the present disclosure. The device 1405 may be an example of or include the components of a device 1105, a device 1205, or a network entity 105 as described herein. The device 1405 may communicate wirelessly with one or more network entities 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting spatial diversity in sidelink communications). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other network entities 105, and may include a controller or scheduler for controlling communications with UEs 115 in cooperation with other network entities 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between network entities 105.

The communications manager 1420 may support wireless communication at a wireless node in accordance with examples as disclosed herein. For example, the communications manager 1420 may be configured as or otherwise support a means for transmitting, to a first UE and a second UE, an indication of a configuration for multiple path relaying, the multiple path relaying including a first path between the wireless node and a third UE via the first UE and a second path between the wireless node and the third UE via the second UE. The communications manager 1420 may be configured as or otherwise support a means for transmitting, to the first UE, data for the third UE on a first set of resources for the first path that are based on the configuration for the multiple path relaying. The communications manager 1420 may be configured as or otherwise support a means for transmitting, to the second UE, data for the third UE on a second set of resources for the second path that are based on the configuration for the multiple path relaying.

By including or configuring the communications manager 1420 in accordance with examples as described herein, the device 1405 may support techniques for spatial diversity for supporting URLLC and other applications by increasing coverage and reducing signaling overhead. Further, the multiple relay UE configuration as described herein may support higher data rates and diversity for control and data, thereby improving latency and reliability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described herein with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of spatial diversity in sidelink communications as described herein, or the processor 1440 and the memory 1430 may be otherwise configured to perform or support such operations.

Figure 15:
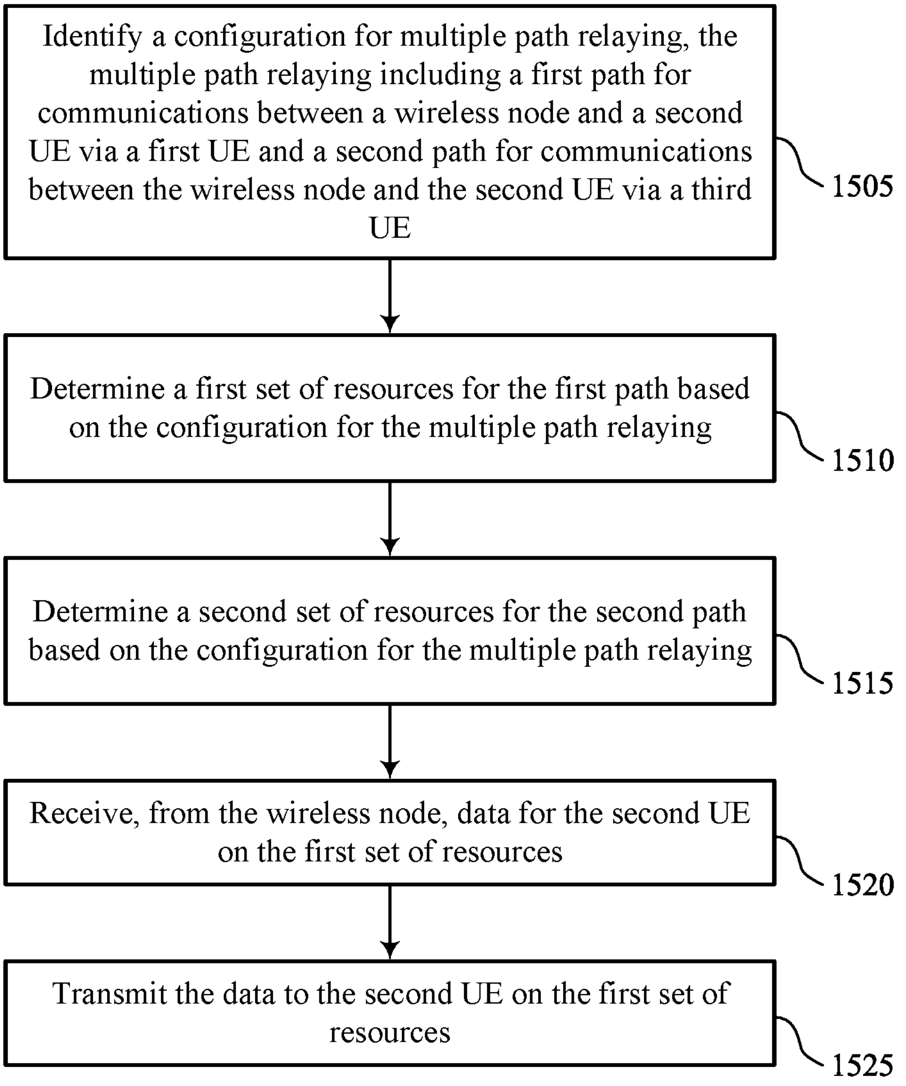
FIGS. 15 through 19 show flowcharts illustrating methods that support spatial diversity in sidelink communications in accordance with aspects of the present disclosure.

FIG. 15 shows a flowchart illustrating a method 1500 that supports spatial diversity in sidelink communications in accordance with aspects of the present disclosure. The operations of the method 1500 may be implemented by a UE or its components as described herein. For example, the operations of the method 1500 may be performed by a UE 115 as described herein with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include identifying a configuration for multiple path relaying, the multiple path relaying including a first path for communications between a wireless node and a second UE via a first UE and a second path for communications between the wireless node and the second UE via a third UE. The operations of 1505 may be performed in accordance with examples as disclosed herein. In some examples, aspects of the operations of 1505 may be performed by a configuration identification component 925 as described herein with reference to FIG. 9.

At 1510, the method may include determining a first set of resources for the first path based on the configuration for the multiple path relaying. The operations of 1510 may be performed in accordance with examples as disclosed herein. In some examples, aspects of the operations of 1510 may be performed by a resource set determination component 930 as described herein with reference to FIG. 9.

At 1515, the method may include determining a second set of resources for the second path based on the configuration for the multiple path relaying. The operations of 1515 may be performed in accordance with examples as disclosed herein. In some examples, aspects of the operations of 1515 may be performed by a resource set determination component 930 as described herein with reference to FIG. 9.

At 1520, the method may include receiving, from the wireless node, data for the second UE on the first set of resources. The operations of 1520 may be performed in accordance with examples as disclosed herein. In some examples, aspects of the operations of 1520 may be performed by a data reception component 935 as described herein with reference to FIG. 9.

At 1525, the method may include transmitting the data to the second UE on the first set of resources. The operations of 1525 may be performed in accordance with examples as disclosed herein. In some examples, aspects of the operations of 1525 may be performed by a relaying component 940 as described herein with reference to FIG. 9.

Figure 16:
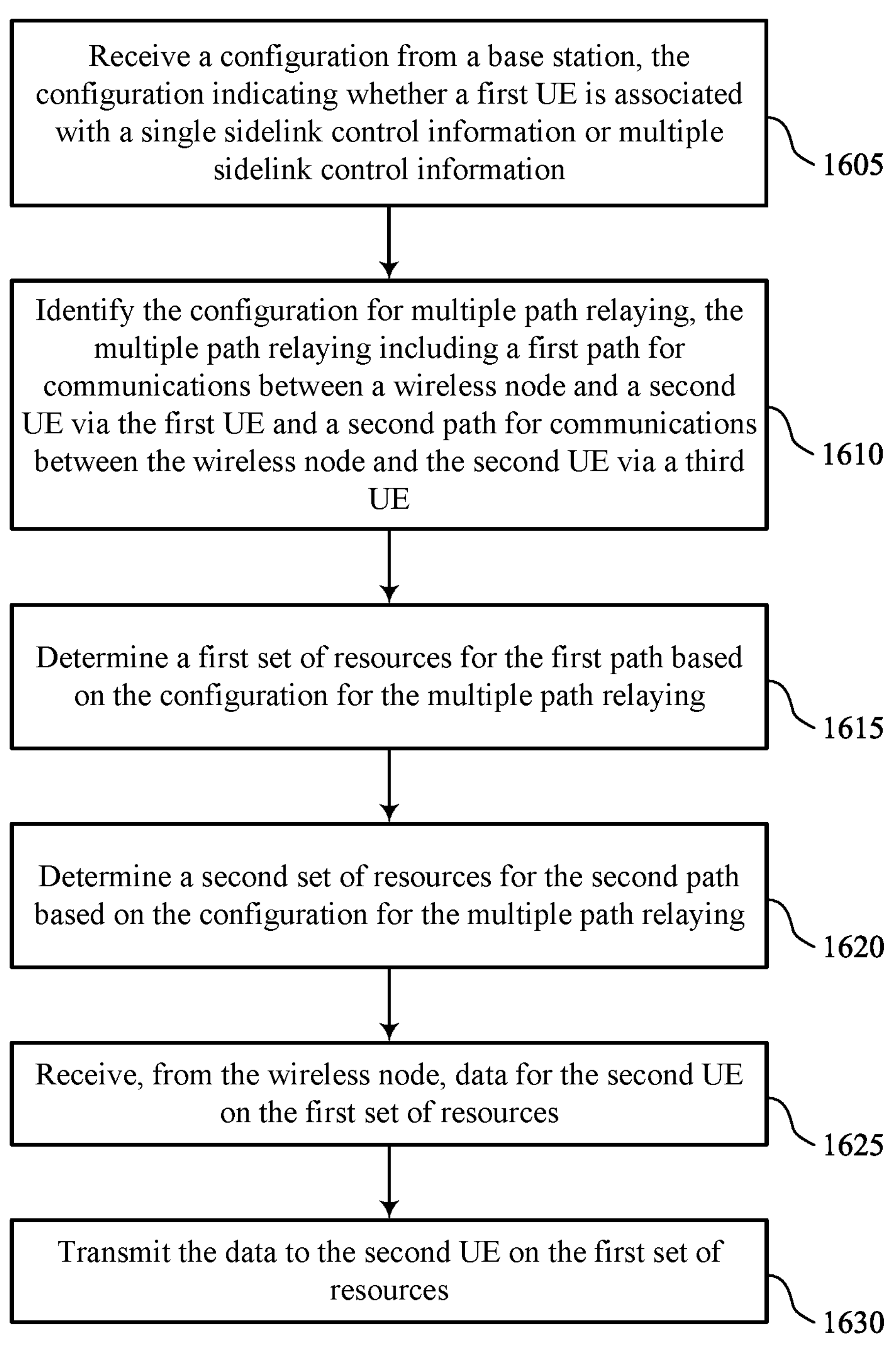

FIG. 16 shows a flowchart illustrating a method 1600 that supports spatial diversity in sidelink communications in accordance with aspects of the present disclosure. The operations of the method 1600 may be implemented by a UE or its components as described herein. For example, the operations of the method 1600 may be performed by a UE 115 as described herein with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving a configuration from a network entity, the configuration indicating whether a first UE is associated with an sSCI or mSCI. The operations of 1605 may be performed in accordance with examples as disclosed herein. In some examples, aspects of the operations of 1605 may be performed by an SCI configuration reception component 945 as described herein with reference to FIG. 9.

At 1610, the method may include identifying the configuration for multiple path relaying, the multiple path relaying including a first path for communications between a wireless node and a second UE via the first UE and a second path for communications between the wireless node and the second UE via a third UE. The operations of 1610 may be performed in accordance with examples as disclosed herein. In some examples, aspects of the operations of 1610 may be performed by a configuration identification component 925 as described herein with reference to FIG. 9.

At 1615, the method may include determining a first set of resources for the first path based on the configuration for the multiple path relaying. The operations of 1615 may be performed in accordance with examples as disclosed herein. In some examples, aspects of the operations of 1615 may be performed by a resource set determination component 930 as described herein with reference to FIG. 9.

At 1620, the method may include determining a second set of resources for the second path based on the configuration for the multiple path relaying. The operations of 1620 may be performed in accordance with examples as disclosed herein. In some examples, aspects of the operations of 1620 may be performed by a resource set determination component 930 as described herein with reference to FIG. 9.

At 1625, the method may include receiving, from the wireless node, data for the second UE on the first set of resources. The operations of 1625 may be performed in accordance with examples as disclosed herein. In some examples, aspects of the operations of 1625 may be performed by a data reception component 935 as described herein with reference to FIG. 9.

At 1630, the method may include transmitting the data to the second UE on the first set of resources. The operations of 1630 may be performed in accordance with examples as disclosed herein. In some examples, aspects of the operations of 1630 may be performed by a relaying component 940 as described herein with reference to FIG. 9.

Figure 17:
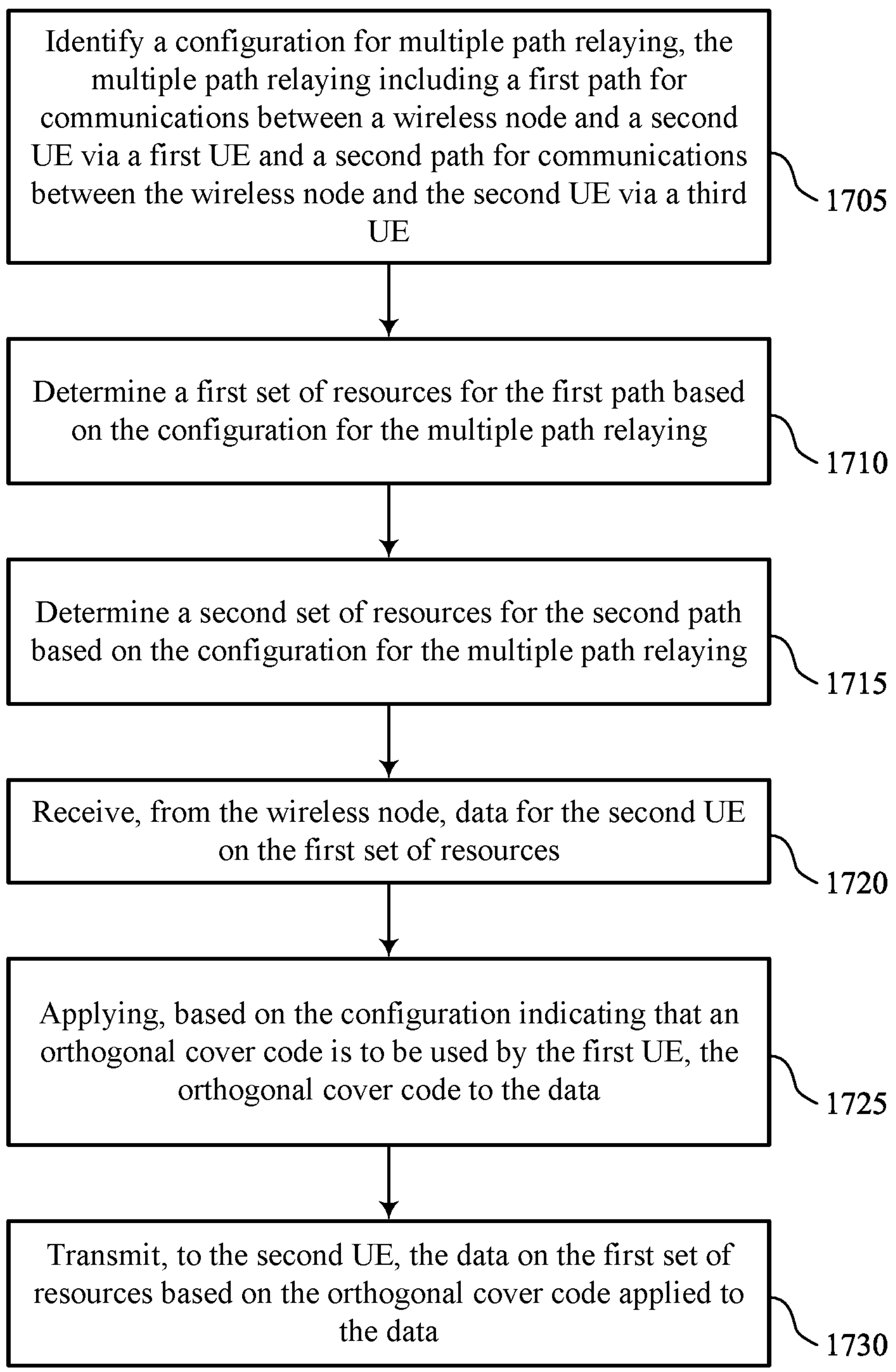

FIG. 17 shows a flowchart illustrating a method 1700 that supports spatial diversity in sidelink communications in accordance with aspects of the present disclosure. The operations of the method 1700 may be implemented by a UE or its components as described herein. For example, the operations of the method 1700 may be performed by a UE 115 as described herein with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include identifying a configuration for multiple path relaying, the multiple path relaying including a first path for communications between a wireless node and a second UE via a first UE and a second path for communications between the wireless node and the second UE via a third UE. The operations of 1705 may be performed in accordance with examples as disclosed herein. In some examples, aspects of the operations of 1705 may be performed by a configuration identification component 925 as described herein with reference to FIG. 9.

At 1710, the method may include determining a first set of resources for the first path based on the configuration for the multiple path relaying. The operations of 1710 may be performed in accordance with examples as disclosed herein. In some examples, aspects of the operations of 1710 may be performed by a resource set determination component 930 as described herein with reference to FIG. 9.

At 1715, the method may include determining a second set of resources for the second path based on the configuration for the multiple path relaying. The operations of 1715 may be performed in accordance with examples as disclosed herein. In some examples, aspects of the operations of 1715 may be performed by a resource set determination component 930 as described herein with reference to FIG. 9.

At 1720, the method may include receiving, from the wireless node, data for the second UE on the first set of resources. The operations of 1720 may be performed in accordance with examples as disclosed herein. In some examples, aspects of the operations of 1720 may be performed by a data reception component 935 as described herein with reference to FIG. 9.

At 1725, the method may include applying, based on the configuration indicating that an OCC is to be used by the first UE, the OCC to the data. The operations of 1725 may be performed in accordance with examples as disclosed herein. In some examples, aspects of the operations of 1725 may be performed by a relaying component 940 as described herein with reference to FIG. 9.

At 1730, the method may include transmitting, to the second UE, the data on the first set of resources based on the OCC applied to the data. The operations of 1730 may be performed in accordance with examples as disclosed herein. In some examples, aspects of the operations of 1730 may be performed by a relaying component 940 as described herein with reference to FIG. 9.

Figure 18:
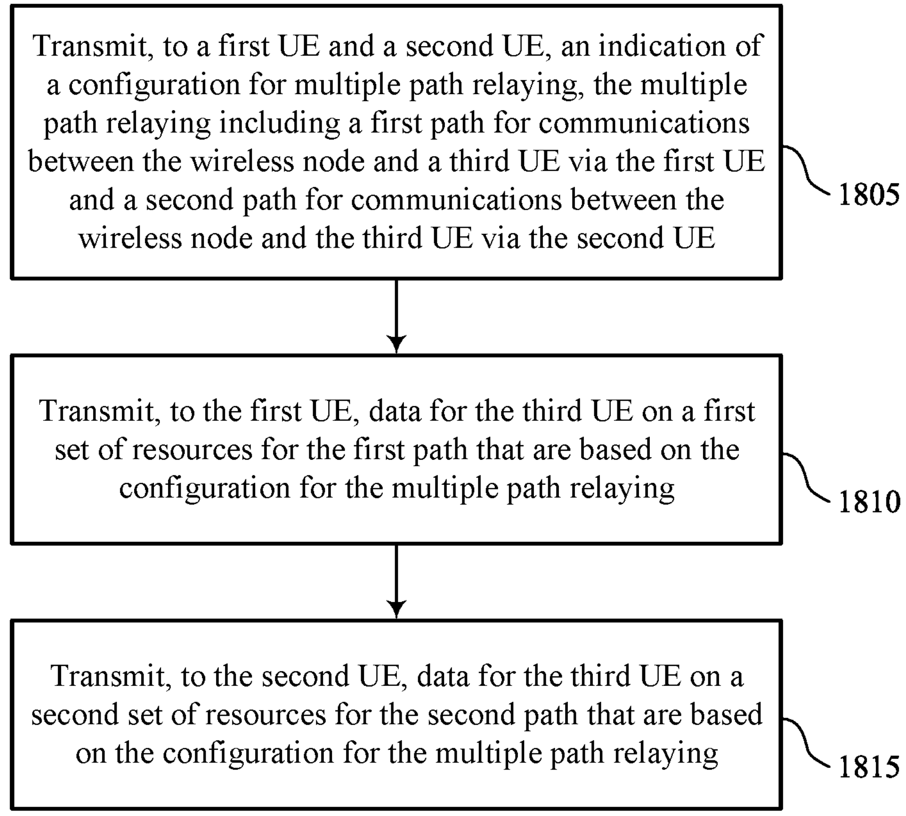

FIG. 18 shows a flowchart illustrating a method 1800 that supports spatial diversity in sidelink communications in accordance with aspects of the present disclosure. The operations of the method 1800 may be implemented by a network entity or its components as described herein. For example, the operations of the method 1800 may be performed by a network entity 105 as described herein with reference to FIGS. 1 through 6 and 11 through 14. In some examples, a network entity may execute a set of instructions to control the functional elements of the network entity to perform the described functions. Additionally or alternatively, the network entity may perform aspects of the described functions using special-purpose hardware.

At 1805, the method may include transmitting, to a first UE and a second UE, an indication of a configuration for multiple path relaying, the multiple path relaying including a first path between the wireless node and a third UE via the first UE and a second path between the wireless node and the third UE via the second UE. The operations of 1805 may be performed in accordance with examples as disclosed herein. In some examples, aspects of the operations of 1805 may be performed by a configuration indication transmission component 1325 as described herein with reference to FIG. 13.

At 1810, the method may include transmitting, to the first UE, data for the third UE on a first set of resources for the first path that are based on the configuration for the multiple path relaying. The operations of 1810 may be performed in accordance with examples as disclosed herein. In some examples, aspects of the operations of 1810 may be performed by a first resource set transmission component 1330 as described herein with reference to FIG. 13.

At 1815, the method may include transmitting, to the second UE, data for the third UE on a second set of resources for the second path that are based on the configuration for the multiple path relaying. The operations of 1815 may be performed in accordance with examples as disclosed herein. In some examples, aspects of the operations of 1815 may be performed by a second resource set transmission component 1335 as described herein with reference to FIG. 13.

Figure 19:
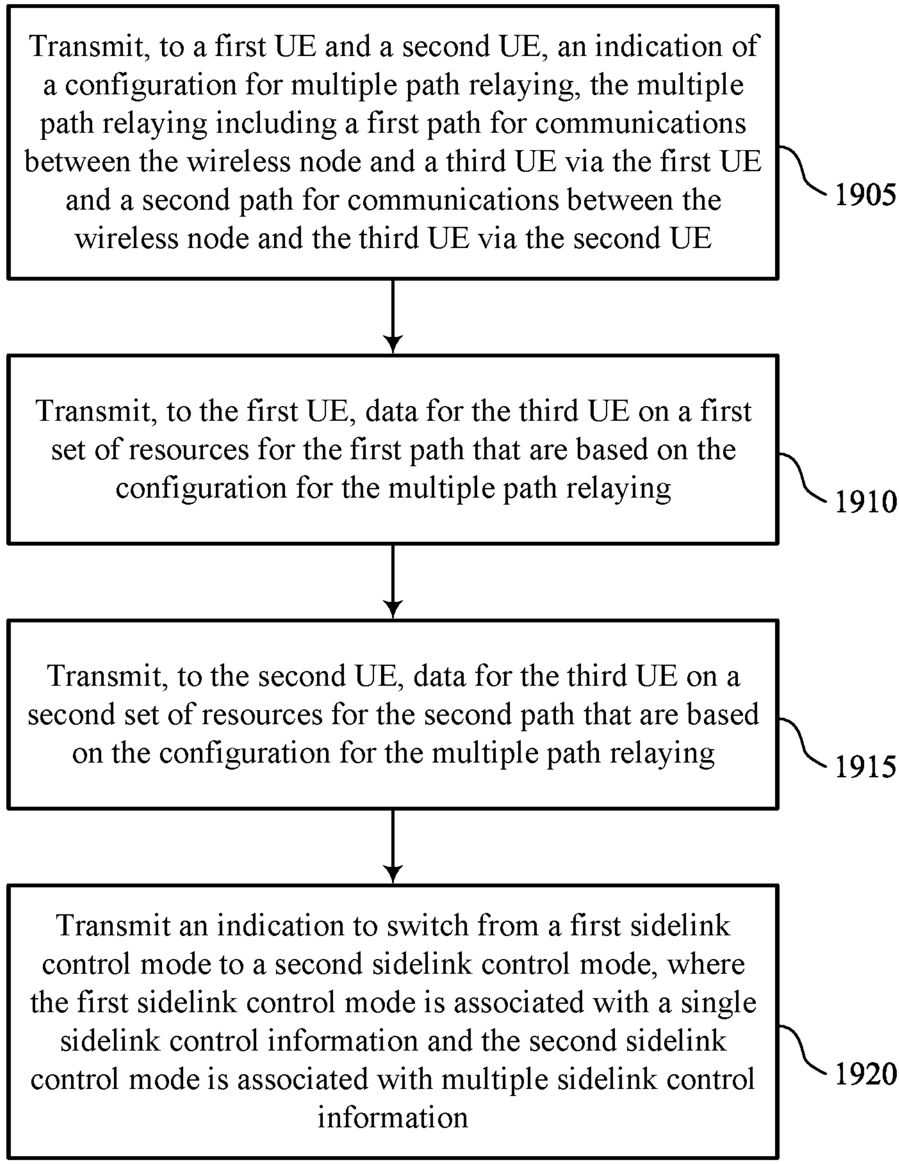

FIG. 19 shows a flowchart illustrating a method 1900 that supports spatial diversity in sidelink communications in accordance with aspects of the present disclosure. The operations of the method 1900 may be implemented by a network entity or its components as described herein. For example, the operations of the method 1900 may be performed by a network entity 105 as described herein with reference to FIGS. 1 through 6 and 11 through 14. In some examples, a network entity may execute a set of instructions to control the functional elements of the network entity to perform the described functions. Additionally or alternatively, the network entity may perform aspects of the described functions using special-purpose hardware.

At 1905, the method may include transmitting, to a first UE and a second UE, an indication of a configuration for multiple path relaying, the multiple path relaying including a first path between the wireless node and a third UE via the first UE and a second path between the wireless node and the third UE via the second UE. The operations of 1905 may be performed in accordance with examples as disclosed herein. In some examples, aspects of the operations of 1905 may be performed by a configuration indication transmission component 1325 as described herein with reference to FIG. 13.

At 1910, the method may include transmitting, to the first UE, data for the third UE on a first set of resources for the first path that are based on the configuration for the multiple path relaying. The operations of 1910 may be performed in accordance with examples as disclosed herein. In some examples, aspects of the operations of 1910 may be performed by a first resource set transmission component 1330 as described herein with reference to FIG. 13.

At 1915, the method may include transmitting, to the second UE, data for the third UE on a second set of resources for the second path that are based on the configuration for the multiple path relaying. The operations of 1915 may be performed in accordance with examples as disclosed herein. In some examples, aspects of the operations of 1915 may be performed by a second resource set transmission component 1335 as described herein with reference to FIG. 13.

At 1920, the method may include transmitting an indication to switch from a first sidelink control mode to a second sidelink control mode, where the first sidelink control mode is associated with an sSCI and the second sidelink control mode is associated with mSCI. The operations of 1920 may be performed in accordance with examples as disclosed herein. In some examples, aspects of the operations of 1920 may be performed by a sidelink control mode transmission component 1355 as described herein with reference to FIG. 13.

The following provides an overview of aspects of the present disclosure:

Aspect 1: A method for wireless communication at a first UE, comprising: identifying a configuration for multiple path relaying, the multiple path relaying comprising a first path for communications between a wireless node and a second UE via the first UE and a second path for communications between the wireless node and the second UE via a third UE; determining a first set of resources for the first path based at least in part on the configuration for the multiple path relaying; determining a second set of resources for the second path based at least in part on the configuration for the multiple path relaying; receiving, from the wireless node, data for the second UE on the first set of resources; and transmitting the data to the second UE on the first set of resources.

Aspect 2: The method of aspect 1, wherein identifying the configuration comprises: receiving the configuration from a network entity, the configuration indicating whether the first UE is associated with a single sidelink control information or multiple sidelink control information.

Aspect 3: The method of any of aspects 1 through 2, further comprising: transmitting control information to the second UE based at least in part on the configuration, the control information identifying both the first set of resources for the first path and the second set of resources for the second path.

Aspect 4: The method of any of aspects 1 through 3, wherein the configuration indicates that the first set of resources is FDMed with the second set of resources, TDMed with the second set of resources, SDMed with the second set of resources, or any combination thereof.

Aspect 5: The method of any of aspects 1 through 4, wherein the configuration indicates that the first set of resources is SDMed with the second set of resources, the method further comprising: identifying a DRMS CDM group assignment for the first UE according to the configuration.

Aspect 6: The method of any of aspects 1 through 5, further comprising: transmitting a sidelink acknowledgement feedback to the wireless node based at least in part on the configuration indicating that the first UE is configured to report the sidelink acknowledgement feedback.

Aspect 7: The method of aspect 6, further comprising: monitoring a PSFCH associated with the data based at least in part on identifying that first UE is configured to report the sidelink acknowledgement feedback.

Aspect 8: The method of any of aspects 1 through 7, wherein transmitting the data on the first set of resources further comprises: applying, based at least in part on the configuration indicating that an orthogonal cover code is to be used by the first UE, the orthogonal cover code to the data; and transmitting, to the second UE, the data on the first set of resources based at least in part on the orthogonal cover code applied to the data.

Aspect 9: The method of any of aspects 1 through 8, wherein the configuration indicates at least one of an MCS, an RV index, a plurality of layers for transmission, an NDI, a HARQ process number, an indication of frequency hopping, a PUCCH for reporting feedback, a time gap, a counter identifier, or any combination thereof.

Aspect 10: The method of any of aspects 1 through 9, further comprising: determining that the first UE is included in a group of relay UEs based at least in part on the configuration, wherein each relay UE in the group of relay UEs is associated with a common radio network temporary identifier, or a common source and destination identifier, or both.

Aspect 11: The method of any of aspects 1 through 10, further comprising: receiving an indication to switch from a first sidelink control mode to a second sidelink control mode, wherein the first sidelink control mode is associated with a single sidelink control information and the second sidelink control mode is associated with multiple sidelink control information; and transmitting, to the second UE, the data according to the second sidelink control mode based at least in part on receiving the indication.

Aspect 12: The method of any of aspects 1 through 11, further comprising: performing a channel sensing operation; and transmitting, to the third UE based at least in part on performing the channel sensing operation, a channel reservation for the first set of resources for transmitting the data to the second UE.

Aspect 13: The method of any of aspects 1 through 12, wherein identifying the configuration comprises: receiving, from a network entity, a control signal comprising the configuration indicating the first set of resources for the first UE and the second set of resources for the third UE.

Aspect 14: The method of any of aspects 1 through 13, wherein one or more of the first path or the second path utilize one-to-many communications from the first UE to the second UE and the third UE.

Aspect 15: A method for wireless communication at a wireless node, comprising: transmitting, to a first UE and a second UE, an indication of a configuration for multiple path relaying, the multiple path relaying comprising a first path between the wireless node and a third UE via the first UE and a second path between the wireless node and the third UE via the second UE; transmitting, to the first UE, data for the third UE on a first set of resources for the first path that are based at least in part on the configuration for the multiple path relaying; and transmitting, to the second UE, data for the third UE on a second set of resources for the second path that are based at least in part on the configuration for the multiple path relaying.

Aspect 16: The method of aspect 15, wherein transmitting the indication of the configuration comprises: transmitting the indication of the configuration to the first UE, the configuration indicating whether the first UE is associated with a single sidelink control information or multiple sidelink control information.

Aspect 17: The method of any of aspects 15 through 16, wherein transmitting the configuration the indication of the configuration comprises: transmitting the configuration indicating that the first UE is to transmit control information for both the data for the third UE on the first set of resources for the first path and the data for the third UE on the second set of resources for the second path.

Aspect 18: The method of any of aspects 15 through 17, wherein the configuration indicates that the first set of resources is FDMed with the second set of resources, TDMed with the second set of resources, SDMed with the second set of resources, or any combination thereof.

Aspect 19: The method of any of aspects 15 through 18, wherein the configuration indicates that the first set of resources is SDMed with the second set of resources, the method further comprising: identifying a DMRS CDM group assignment for the first UE according to the configuration.

Aspect 20: The method of any of aspects 15 through 19, further comprising: receiving a sidelink acknowledgement feedback based at least in part on the configuration indicating that the first UE is configured to report the sidelink acknowledgement feedback.

Aspect 21: The method of any of aspects 15 through 20, wherein the configuration further indicates that a physical sidelink shared channel orthogonal cover code is to be used by the first UE for transmitting the data to the third UE.

Aspect 22: The method of any of aspects 15 through 21, wherein the configuration further indicates at least one of an MCS, an RV index, a plurality of layers for transmission, a new data indicator, a HARQ process number, an indication of frequency hopping, a PUCCH for reporting feedback, a time gap, a counter identifier, or any combination thereof.

Aspect 23: The method of any of aspects 15 through 22, wherein transmitting the indication of the configuration comprises: transmitting the indication of the configuration of the first UE via RRC signaling, DCI, or a MAC CE.

Aspect 24: The method of any of aspects 15 through 23, further comprising: determining that the first UE is included in a group of relay UEs based at least in part on the configuration, wherein each relay UE in the group of relay UEs is associated with a common radio network temporary identifier, or a common source and destination identifier, or both.

Aspect 25: The method of any of aspects 15 through 24, further comprising: transmitting an indication to switch from a first sidelink control mode to a second sidelink control mode, wherein the first sidelink control mode is associated with a single sidelink control information and the second sidelink control mode is associated with multiple sidelink control information.

Aspect 26: The method of any of aspects 15 through 25, wherein identifying the configuration comprises: transmitting, to the first UE, a first control signal comprising the configuration for the multiple path relaying indicating the first set of resources; and transmitting, to the second UE, a second control signal comprising the second set of resources for the second UE.

Aspect 27: The method of any of aspects 15 through 26, wherein one or more of the first path or the second path utilize one-to-many communications from the first UE to the second UE and the third UE.

Aspect 28: An apparatus for wireless communication at a first UE, comprising a processor; and a memory coupled with the processor, with instructions stored in the memory, the instructions being executable by the processor to cause the apparatus to perform a method of any of aspects 1 through 14.

Aspect 29: An apparatus for wireless communication at a first UE, comprising at least one means for performing a method of any of aspects 1 through 14.

Aspect 30: A non-transitory computer-readable medium storing code for wireless communication at a first UE, the code comprising instructions executable by a processor to perform a method of any of aspects 1 through 14.

Aspect 31: An apparatus for wireless communication at a wireless node, comprising a processor; and a memory coupled with the processor, with instructions stored in the memory, the instructions being executable by the processor to cause the apparatus to perform a method of any of aspects 15 through 26.

Aspect 32: An apparatus for wireless communication at a wireless node, comprising at least one means for performing a method of any of aspects 15 through 26.

Aspect 33: A non-transitory computer-readable medium storing code for wireless communication at a wireless node, the code comprising instructions executable by a processor to perform a method of any of aspects 15 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:

receiving a configuration for multiple path relaying, the multiple path relaying comprising a first path for communications between a wireless node and a second UE via the first UE and a second path for communications between the wireless node and the second UE via a third UE, wherein the configuration indicates whether the multiple path relaying is associated with a single sidelink control information or multiple sidelink control information;

determining a first set of resources for the first path based at least in part on the configuration for the multiple path relaying;

determining a second set of resources for the second path based at least in part on the configuration for the multiple path relaying;

receiving, from the wireless node, data for the second UE on the first set of resources; and transmitting the data to the second UE on the first set of resources.

2. The method of claim 1, further comprising:

transmitting control information to the second UE based at least in part on the configuration, the control information identifying both the first set of resources for the first path and the second set of resources for the second path.

3. The method of claim 1, wherein the configuration indicates that the first set of resources is frequency division multiplexed with the second set of resources, time division multiplexed with the second set of resources, spatial division multiplexed with the second set of resources, or any combination thereof.

4. The method of claim 1, wherein the configuration indicates that the first set of resources is spatial division multiplexed with the second set of resources, the method further comprising:

identifying a demodulation reference signal code division multiplexing group assignment for the first UE according to the configuration.

5. The method of claim 1, further comprising:

transmitting a sidelink acknowledgement feedback to the wireless node based at least in part on the configuration indicating that the first UE is configured to report the sidelink acknowledgement feedback.

6. The method of claim 5, further comprising:

monitoring a physical sidelink feedback channel associated with the data based at least in part on identifying that first UE is configured to report the sidelink acknowledgement feedback.

7. The method of claim 1, wherein transmitting the data on the first set of resources further comprises:

applying, based at least in part on the configuration indicating that an orthogonal cover code is to be used by the first UE, the orthogonal cover code to the data; and transmitting, to the second UE, the data on the first set of resources based at least in part on the orthogonal cover code applied to the data.

8. The method of claim 1, wherein the configuration indicates at least one of a modulation and coding scheme, a redundancy version index, a plurality of layers for transmission, a new data indicator, a hybrid automatic repeat request process number, an indication of frequency hopping, a physical uplink control channel for reporting feedback, a time gap, a counter identifier, or any combination thereof.

9. The method of claim 1, further comprising:

determining that the first UE is included in a group of UEs based at least in part on the configuration, wherein each UE in the group of UEs is associated with a common radio network temporary identifier, or a common source and destination identifier, or both.

10. The method of claim 1, further comprising:

receiving an indication to switch from a first sidelink control mode to a second sidelink control mode, wherein the first sidelink control mode is associated with the single sidelink control information and the second sidelink control mode is associated with the multiple sidelink control information; and transmitting, to the second UE, the data according to the second sidelink control mode based at least in part on receiving the indication.

11. The method of claim 1, further comprising:

performing a channel sensing operation; and transmitting, to the third UE based at least in part on performing the channel sensing operation, a channel reservation for the first set of resources for transmitting the data to the second UE.

12. The method of claim 1, wherein identifying the configuration comprises:

receiving, from a network entity, a control signal comprising the configuration indicating the first set of resources for the first UE and the second set of resources for the third UE.

13. The method of claim 1, wherein one or more of the first path or the second path utilize one-to-many communications from the first UE to the second UE and the third UE.

14. A method for wireless communication at a wireless node, comprising:

transmitting, to a first user equipment (UE) and a second UE, an indication of a configuration for multiple path relaying, the multiple path relaying comprising a first path for communications between the wireless node and a third UE via the first UE and a second path for communications between the wireless node and the third UE via the second UE, wherein the configuration indicates whether the multiple path relaying is associated with a single sidelink control information or multiple sidelink control information;

transmitting, to the first UE, data for the third UE on a first set of resources for the first path that are based at least in part on the configuration for the multiple path relaying; and transmitting, to the second UE, data for the third UE on a second set of resources for the second path that are based at least in part on the configuration for the multiple path relaying.

15. The method of claim 14, wherein transmitting the indication of the configuration comprises:

transmitting the configuration indicating that the first UE is to transmit control information for both the data for the third UE on the first set of resources for the first path and the data for the third UE on the second set of resources for the second path.

16. The method of claim 14, wherein the configuration indicates that the first set of resources is frequency division multiplexed with the second set of resources, time division multiplexed with the second set of resources, spatial division multiplexed with the second set of resources, or any combination thereof.

17. The method of claim 14, wherein the configuration indicates that the first set of resources is spatial division multiplexed with the second set of resources, the method further comprising:

identifying a demodulation reference signal code division multiplexing group assignment for the first UE according to the configuration.

18. The method of claim 14, further comprising:

receiving a sidelink acknowledgement feedback based at least in part on the configuration indicating that the first UE is configured to report the sidelink acknowledgement feedback.

19. The method of claim 14, wherein the configuration further indicates that a physical sidelink shared channel orthogonal cover code is to be used by the first UE for transmitting the data to the third UE.

20. The method of claim 14, wherein the configuration further indicates at least one of a modulation and coding scheme, a redundancy version index, a plurality of layers for transmission, a new data indicator, a hybrid automatic repeat request process number, an indication of frequency hopping, a physical uplink control channel for reporting feedback, a time gap, a counter identifier, or any combination thereof.

21. The method of claim 14, further comprising:

determining that the first UE is included in a group of UEs based at least in part on the configuration, wherein each UE in the group of UEs is associated with a common radio network temporary identifier, or a common source and destination identifier, or both.

22. A first user equipment (UE) for wireless communications, comprising:

at least one processor; and at least one memory coupled with the at least one processor, with instructions stored in the at least one memory, the instructions being executable by the at least one processor to cause the first UE to:

receive a configuration for multiple path relaying, the multiple path relaying comprising a first path for communications between a wireless node and a second UE via the first UE and a second path for communications between the wireless node and the second UE via a third UE, wherein the configuration indicates whether the multiple path relaying is associated with a single sidelink control information or multiple sidelink control information;

determine a first set of resources for the first path based at least in part on the configuration for the multiple path relaying;

determine a second set of resources for the second path based at least in part on the configuration for the multiple path relaying;

receive, from the wireless node, data for the second UE on the first set of resources; and transmit the data to the second UE on the first set of resources.

23. The first UE of claim 22, wherein the instructions are further executable by the at least one processor to cause the first UE to:

transmit control information to the second UE based at least in part on the configuration, the control information identifying both the first set of resources for the first path and the second set of resources for the second path.

24. The first UE of claim 22, wherein the configuration indicates that the first set of resources is frequency division multiplexed with the second set of resources, time division multiplexed with the second set of resources, spatial division multiplexed with the second set of resources, or any combination thereof.

25. The first UE of claim 22, wherein the configuration indicates that the first set of resources is spatial division multiplexed with the second set of resources, and wherein the instructions are further executable by the at least one processor to cause the first UE to:

identify a demodulation reference signal code division multiplexing group assignment for the first UE according to the configuration.

26. The first UE of claim 22, wherein the instructions are further executable by the at least one processor to cause the first UE to:

transmit a sidelink acknowledgement feedback to the wireless node based at least in part on the configuration indicating that the first UE is configured to report the sidelink acknowledgement feedback.

27. A wireless node for wireless communications, comprising:

at least one processor; and at least one memory coupled with the at least one processor, with instructions stored in the at least one memory, the instructions being executable by the at least one processor to cause the wireless node to:

transmit, to a first user equipment (UE) and a second UE, an indication of a configuration for multiple path relaying, the multiple path relaying comprising a first path between the wireless node and a third UE via the first UE and a second path between the wireless node and the third UE via the second UE, wherein the configuration indicates whether the multiple path relaying is associated with a single sidelink control information or multiple sidelink control information;

transmit, to the first UE, data for the third UE on a first set of resources for the first path that are based at least in part on the configuration for the multiple path relaying; and transmit, to the second UE, data for the third UE on a second set of resources for the second path that are based at least in part on the configuration for the multiple path relaying.

28. The wireless node of claim 27, wherein the instructions to transmit the configuration the indication of the configuration are executable by the at least one processor to cause the wireless node to:

transmit the configuration indicating that the first UE is to transmit control information for both the data for the third UE on the first set of resources for the first path and the data for the third UE on the second set of resources for the second path.

29. The wireless node of claim 27, wherein the configuration indicates that the first set of resources is frequency division multiplexed with the second set of resources, time division multiplexed with the second set of resources, spatial division multiplexed with the second set of resources, or any combination thereof.

30. The wireless node of claim 27, wherein the configuration indicates that the first set of resources is spatial division multiplexed with the second set of resources, and wherein the instructions are further executable by the at least one processor to cause the wireless node to:

identify a demodulation reference signal code division multiplexing group assignment for the first UE according to the configuration.

* * * * *